(12) United States Patent
Park et al.

(10) Patent No.: US 12,463,669 B2
(45) Date of Patent: Nov. 4, 2025

(54) SHARED FILTER FOR TRANSMISSION AND RECEPTION

(71) Applicant: Qualcomm Incorporated, San Diego, CA (US)

(72) Inventors: Sunghyun Park, Campbell, CA (US); Jinbo Li, San Jose, CA (US); Ara Bicakci, Sunol, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/338,755

(22) Filed: Jun. 21, 2023

(65) Prior Publication Data

US 2024/0429946 A1 Dec. 26, 2024

(51) Int. Cl.
*H04B 1/52* (2015.01)
*H04B 1/00* (2006.01)
*H04B 1/04* (2006.01)

(52) U.S. Cl.
CPC ......... *H04B 1/0078* (2013.01); *H04B 1/0458* (2013.01); *H04B 2001/0408* (2013.01)

(58) Field of Classification Search
CPC ................ H04B 1/0078; H04B 1/0458; H04B 2001/0408
USPC ...................................................... 455/552.1
See application file for complete search history.

(56) References Cited

U.S. PATENT DOCUMENTS

| | | | |
|---|---|---|---|
| 8,204,451 B1 | 6/2012 | Kheirkhahi et al. | |
| 2012/0128178 A1* | 5/2012 | Fujii | H04S 7/30 381/98 |
| 2014/0323066 A1* | 10/2014 | Zhang | H03F 3/195 455/77 |
| 2018/0351535 A1* | 12/2018 | Karmaker | H03F 3/45475 |

FOREIGN PATENT DOCUMENTS

FR 3049794 A1 * 10/2017 ............. H04B 7/185

* cited by examiner

*Primary Examiner* — Tanmay K Shah
(74) *Attorney, Agent, or Firm* — Loza & Loza LLP

(57) ABSTRACT

An apparatus is disclosed for sharing a filter circuit between transmission and reception modes. In example aspects, the apparatus includes a wireless interface device. The wireless interface device includes a transmit chain, a receive chain, and a filter circuit. The transmit chain includes a first component and a second component. The receive chain includes a third component and a fourth component. The filter circuit includes an amplifier, and the amplifier includes a first stage and a second stage. The first stage includes a transmit portion coupled to the second stage and a receive portion coupled to the second stage. The transmit portion and the second stage are coupled together in series between the first component and the second component of the transmit chain. The receive portion and the second stage are coupled together in series between the third component and the fourth component of the receive chain.

30 Claims, 16 Drawing Sheets

SHARED FILTER FOR TRANSMISSION AND RECEPTION

TECHNICAL FIELD

This disclosure relates generally to signal communication or signal processing using an electronic device and, more specifically, to a filter that can be shared between a transmit mode and a receive mode.

BACKGROUND

Electronic devices include traditional computing devices such as desktop computers, notebook computers, smartphones, wearable devices like a smartwatch, internet servers, and so forth. Electronic devices also include other types of computing devices such as personal voice assistants (e.g., smart speakers), wireless access points or routers, thermostats and other automated controllers, robotics, automotive electronics, devices embedded in other machines like refrigerators and industrial tools, Internet of Things (IoT) devices, medical devices, and so forth. These various electronic devices provide services relating to productivity, communication, social interaction, security, health and safety, remote management, entertainment, transportation, and information dissemination. Thus, electronic devices play crucial roles in modern society.

Many of the services provided by electronic devices in today's interconnected world depend at least partly on electronic communications. Electronic communications can include, for example, those exchanged between two or more electronic devices using wireless or wired signals that are transmitted over one or more networks, such as the Internet, a Wi-Fi® network, or a cellular network. Electronic communications can therefore include wireless or wired transmissions and receptions. To transmit and receive communications, an electronic device can use a transceiver, such as a wireless transceiver that is designed for wireless communications.

Some electronic communications can thus be realized by propagating signals between two wireless transceivers at two different electronic devices. For example, using a wireless transmitter, a smartphone can transmit a wireless signal to a base station over the air as part of an uplink communication to support mobile services. Using a wireless receiver, the smartphone can receive a wireless signal that is transmitted from the base station via the air medium as part of a downlink communication to enable mobile services. With a smartphone, for instance, mobile services can include making voice and video calls, participating in social media interactions, sending messages, watching movies, sharing videos, performing searches, using map information or navigational instructions, finding friends, engaging in location-based services generally, transferring money, obtaining another service like a car ride, and so forth. A smartphone or other electronic device can also communicate with a network via customer premises equipment (CPE) or an access point (AP), such as a Wi-Fi® access point or router, to participate in mobile services or engage in other communications.

Accordingly, many mobile and other communication-based services depend at least partly on the transmission or reception of wireless signals between two or more electronic devices. Consequently, researchers, electrical engineers, and other designers of electronic devices strive to develop wireless transceivers and associated hardware that can use wireless signals effectively to provide mobile services, create various features that are convenient for users, and even provide functions that are critical for modern society.

SUMMARY

Filters, including analog filters, can occupy appreciable space in a wireless interface device, and space adds size and cost to an electronic device. One filter for a transmit chain and another filter for a receive chain can be used, but each filter then occupies a separate space. This document describes a filter circuit that can be shared between a transmit chain and a receive chain. The filter circuit can operate on analog signals and may be shared using time-division multiplexing (TDM). In some cases, the shared filter circuit includes an amplifier, such as a transimpedance amplifier (TIA), and a biquad filter. These two components can be applied to a transmit signal in a transmit mode and to a receive signal in a receive mode. The filter circuit may also include at least one additional passive pole for further bandwidth tuning. The amplifier can include at least two stages: a first stage and a second stage. The first stage, which may operate as an input stage, can include a receive portion that propagates the receive signal and a transmit portion that propagates the transmit signal. The transmit chain and the receive chain may also include one or more other, nonshared components that filter the transmit signal and the receive signal. For example, the transmit chain can include an attenuator that may also isolate the transmit chain from other components during the receive mode. The receive chain can include a programmable gain amplifier that may also isolate the receive chain from other components during the transmit mode. Other example implementations include utilizing the shared filter circuit in various modes, including different test modes. Further, circuit-level examples include components and connections that provide other benefits as described herein. These and additional implementations are set forth in this document, including the associated drawings, which are fully incorporated herein.

In an example aspect, an apparatus is disclosed. The apparatus includes a wireless interface device that includes a transmit chain, a receive chain, and a filter circuit. The transmit chain includes a first component and a second component. The receive chain includes a third component and a fourth component. The filter circuit includes an amplifier, and the amplifier includes a first stage and a second stage. The first stage includes a transmit portion coupled to the second stage and a receive portion coupled to the second stage. The transmit portion and the second stage are coupled together in series between the first component and the second component of the transmit chain. The receive portion and the second stage are coupled together in series between the third component and the fourth component of the receive chain.

In an example aspect, an apparatus for shared filtering is disclosed. The apparatus includes a wireless interface device that includes a transmit chain, a receive chain, and a filter circuit. The transmit chain includes a first component and a second component. The receive chain includes a third component and a fourth component. The filter circuit includes an amplifier, and the amplifier includes a first stage and a second stage. The first stage includes means for accepting a transmit signal from the first component of the transmit chain and means for accepting a receive signal from the third component of the receive chain. The means for accepting a transmit signal and the second stage are coupled together in series between the first component and the second component of the transmit chain. The means for accepting a receive signal and the second stage are coupled together in series between the third component and the fourth component of the receive chain.

In an example aspect, a method for shared filtering or operating a shared filter circuit is disclosed. The method includes accepting, by a transmit portion of a first stage of an amplifier of a filter circuit, a transmit signal from a first component of a transmit chain of a wireless interface device. The method also includes providing, by the transmit portion of the first stage of the amplifier, the transmit signal to a second stage of the amplifier. The method additionally includes forwarding, by the second stage of the amplifier, the transmit signal toward a second component of the transmit chain. The method also includes accepting, by a receive portion of the first stage of the amplifier of the filter circuit, a receive signal from a third component of a receive chain of the wireless interface device. The method additionally includes providing, by the receive portion of the first stage of the amplifier, the receive signal to the second stage of the amplifier. The method further includes forwarding, by the second stage of the amplifier, the receive signal toward a fourth component of the receive chain.

In an example aspect, an apparatus is disclosed. The apparatus includes a wireless interface device. The wireless interface device includes a filter circuit, a resistive attenuator, a programmable gain amplifier, and a resistor bank. The filter circuit includes an input, an output, a transimpedance amplifier, and a biquad filter. The transimpedance amplifier is coupled to the input of the filter circuit. The biquad filter is coupled in series with the transimpedance amplifier between the input and the output of the filter circuit, with the biquad filter coupled between the transimpedance amplifier and the output of the filter circuit. The resistive attenuator is coupled to the output of the filter circuit. The programmable gain amplifier is coupled to the output of the filter circuit. The resistor bank is coupled to the programmable gain amplifier, with the programmable gain amplifier coupled between the output of the filter circuit and the resistor bank.

BRIEF DESCRIPTION OF DRAWINGS

FIGS. 6-1 and 6-2 are schematic diagrams of the example communication components of FIG. 4 illustrating example configurations for two receive modes.

FIGS. 7-1 to 7-4 are schematic diagrams of the example communication components of FIG. 4 illustrating example configurations for four test modes.

FIGS. 8-1 to 8-3 are circuit diagrams of example implementations of the amplifier of the filter circuit of FIGS. 3 and 4.

DETAILED DESCRIPTION

Introduction and Overview

Figure 1:
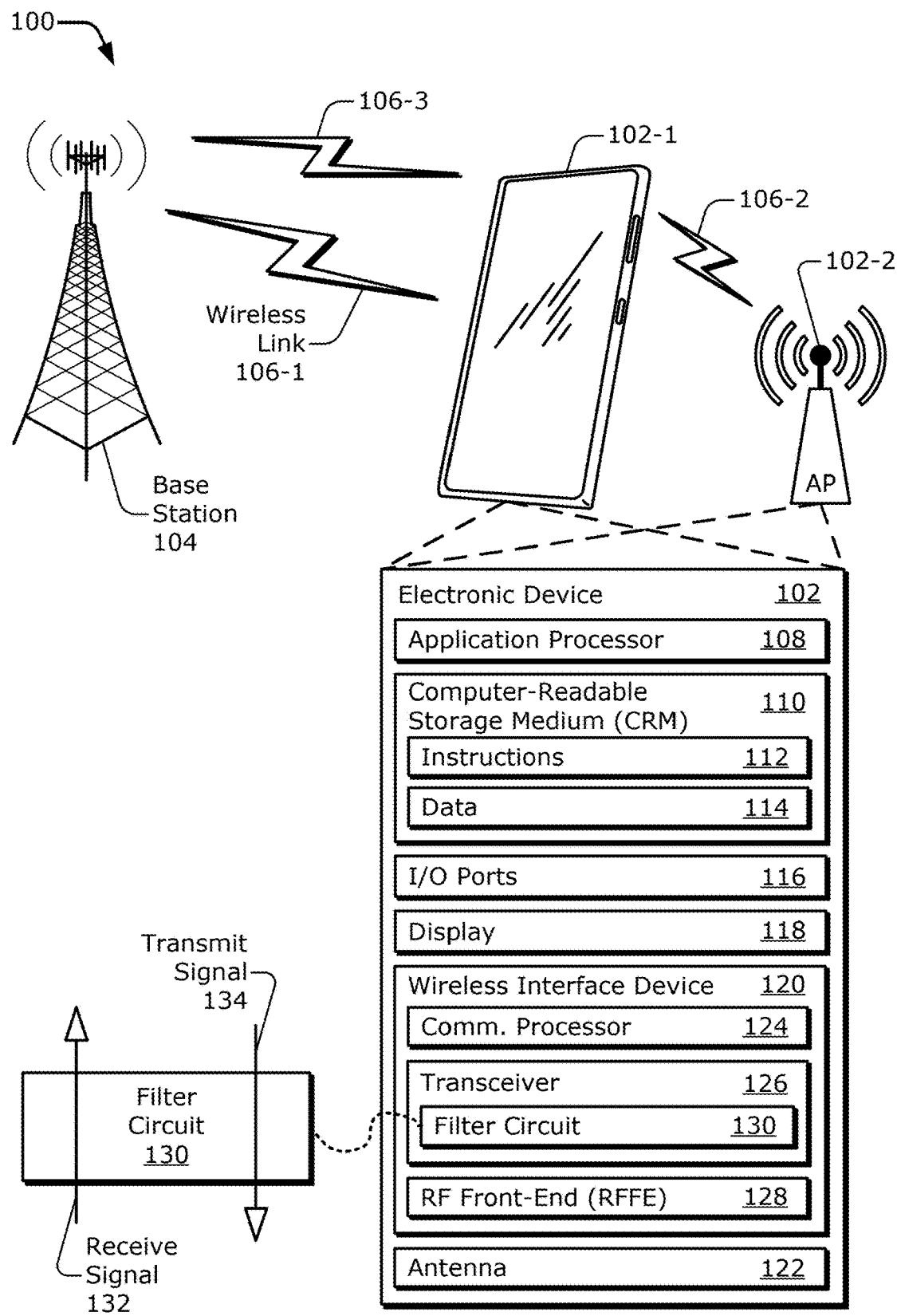
FIG. 1 illustrates an environment with example electronic devices that have a wireless interface device, which includes a transceiver having an example filter circuit.

To provide mobile services and other wireless features and functions, electronic devices typically use a wireless interface device to communicate wireless signals in accordance with some wireless standard. Examples of relatively older wireless standards include a 4th Generation (4G) cellular standard and an IEEE 802.11b or 802.11g Wi-Fi® standard, both of which have been used with smartphones and other connected devices. These wireless standards enable a certain wireless communication speed and efficiency. To enable faster and more efficient wireless networks, efforts are underway to develop newer wireless standards. Next-generation cellular networks and advanced Wi-Fi® networks, for example, are expected to offer significantly higher bandwidths, lower latencies, and access to additional portions of the electromagnetic (EM) spectrum. Taken together, this means that new wireless services can be provided to users, such as safer self-driving vehicles, augmented reality (AR) and other mixed reality (MR) imaging, mobile 4K video streaming, ubiquitous sensors to keep people safe and to use natural resources more efficiently, real-time language translations, and so forth.

To make these new, faster wireless technologies more widely available, many wireless devices besides smartphones and other traditional computing devices will be deployed, which is sometimes referred to as the "Internet of Things" (IoT). Compared to today's use of wireless devices, hundreds of billions of additional devices are expected to be connected to the internet with the arrival of the Internet of Things. To enable next-generation wireless technologies, some IoT devices and many electronic devices generally will operate in accordance with 5th Generation (5G) cellular standards and beyond as well as in accordance with newer Wi-Fi® standards. Such devices will communicate with signals that use wider frequency ranges or that are located at higher frequencies of the EM spectrum as compared to those devices that operate in accordance with older wireless standards. For example, many newer devices will be expected to operate at millimeter wave (mmWave) frequencies (e.g., frequencies between at least 24 and 300 Gigahertz (GHz)), as well as at frequencies in the single-digit GHz range, such as 4.5 to 7.5 GHz.

To accommodate these commercial expectations and surmount the associated technical hurdles, the physical components that enable wireless communications under these constraints will be expected to operate efficiently at higher frequencies. Other constraints on electronic devices, such as cost and size, will continue to be important factors, too. One component that facilitates electronic communication is the wireless interface device. The wireless interface device can include a communication processor, a wireless transceiver, and a radio-frequency front-end (RFFE). Unfortunately, the wireless interface devices designed for electronic devices that operate in accordance with older Wi-Fi® and 4G wireless standards are not adequate for the newer Wi-Fi® and 5G wireless standards, for these standards are expected to accommodate higher frequencies, involve more-stringent latency demands, and meet tighter fiscal constraints.

Consequently, to facilitate the adoption of newer and faster cellular and Wi-Fi® technologies, as well as the widespread deployment of electronic devices that can provide new capabilities and services, wireless interface devices will be deployed having designs that can communicate at GHz frequencies while continuing to meet stipulated size or cost requirements. These wireless interface devices will also be designed to share the available EM spectrum more efficiently. Electrical engineers and other designers of electronic devices are therefore striving to develop new wireless interface devices that will enable the promise of Sub-6 GHz; 5G and 6G cellular; 5 GHz and 6 GHz bands for Wi-Fi®; Wi-Fi® 5, 6, and 6E standards; and other higher-frequency technologies to become a reality.

A wireless interface device can be implemented, for example, with fully separate transmit and receive chains. In such cases, a component that is used in a transmit chain is not used in a receive chain, and vice versa. Consequently, two components of the same type or at least similar purposes may be present in the wireless interface device, with one dedicated to processing transmit signals and another dedicated to processing receive signals. Each component occupies a separate space within the wireless interface device, even though the two components are of the same type or have similar-to-identical purposes. This occupied space, such as additional area on an integrated circuit (IC) or even a whole additional IC chip, can cause an associated electronic device to be larger, which can result in the device being more expensive. Further, with a potentially higher bill of materials (BoM), the cost of the electronic device can increase for this reason also.

An example of a component that is used in a transmit chain and a receive chain to process signals is a filter. A filter component accepts an input signal and produces an output signal. A filter can, for example, affect a magnitude of the output signal at one or more frequencies or at least one frequency range as compared to the magnitude of those frequencies that are present in the input signal. The frequencies at which the filter changes magnitudes can be targeted. Analog filters, or those filters that can process analog signals, are applied to receive signals and transmit signals in a wireless transceiver. Unfortunately, analog filters are inefficient in terms of area and can occupy a space that is large enough to impact a device's size or cost. In some general approaches, two separate analog filters are implemented: a first filter for the receive path and a second filter for the transmit path. These separate analog filters are designed to accommodate different transmit and receive specifications or tuning parameters, even though only one filter is typically enabled at any given moment in functional, non-testing modes.

To address these issues at least partially, this document describes a filter circuit that can be shared between a transmit chain and a receive chain. The filter circuit can be positioned at one or more portions of a wireless interface device, such as a wireless transceiver or a radio-frequency (RF) front-end. With a baseband frequency (BBF) filter, for instance, the filter circuit may be incorporated into the wireless transceiver between a communication processor and an RF front-end. A filter circuit as is described herein, however, may be employed in other portions of a wireless interface device or in other parts of an electronic device generally or may be utilized with other frequencies besides baseband.

In example implementations, a shareable filter circuit includes an amplifier, such as a transimpedance amplifier (TIA), and a biquad filter (BQ filter). These two components can be applied to a transmit signal in a transmit mode and to a receive signal in a receive mode. The filter circuit may also include at least one additional passive pole that is shared for further bandwidth tuning. The amplifier can include at least two stages: a first stage and a second stage. The first stage, which may operate as an input stage, can include a receive portion that propagates the receive signal and a transmit portion that propagates the transmit signal.

The receive portion of the first stage can be tuned to accept the receive signal from a component of a receive chain and to process the receive signal. The transmit portion of the first stage can be tuned to accept the transmit signal from a component of a transmit chain and to process the transmit signal. The second stage of the amplifier and the biquad filter may process the receive signal and the transmit signal, in a time-division multiplexing (TDM) manner for instance. Thus, the bifurcated first stage can facilitate the sharing of other components of the filter circuit between transmit signals and receive signals of the transmit chain and the receive chain, respectively, to reduce size or costs.

The transmit chain and the receive chain may also include one or more other, nonshared components that filter the transmit signal and the receive signal. For example, the transmit chain can include an attenuator that may also isolate the transmit chain from other components during the receive mode. One or more switches that establish an attenuation factor of the attenuator can also be used to produce the isolation for the receive mode, thus obviating the use of a separate, dedicated isolation switch. The receive chain can include a programmable gain amplifier that may also isolate the receive chain from other components during the transmit mode. At least one switch that establishes a gain factor of the programmable gain amplifier can also be used to produce the isolation for the transmit mode, thus obviating the use of a separate, dedicated isolation switch. In these manners, one or more additional components (e.g., at least one switch) can be omitted from a BoM and from an area occupied by the transmit and receive chains in conjunction with implementing a shared filter circuit.

Other example implementations include utilizing the shared filter circuit in various modes. Example described modes include a transmit mode, two receive modes, and four test modes. Further, circuit-level examples include components and connections that provide other benefits. For example, a replica transistor and a replica current source may be included in an input stage of the amplifier to compensate for process corner and temperature variations. As another example, one or two capacitors can be added to at least one stage of a programmable gain amplifier to increase linearity and signal-to-noise ratio (SNR).

In some implementations, circuitry for wireless signaling can operate in a transmit mode in which an analog filter provides gain and image rejection for the output of a digital-to-analog converter (DAC). In a receive mode, the analog filter of the wireless circuitry can provide gain, channel-selection filtering, and anti-aliasing filtering for the input of an analog-to-digital converter (ADC). The analog filter topology enables a significant portion of it to be used for both transmit (TX) and receive (RX) modes. The filter circuit can include an amplifier (e.g., a TIA), a biquad filter (BQ filter), a resistive attenuator (R-attenuator), and a programmable gain amplifier (PGA).

In some aspects, the TIA takes a current input that is received from the DAC in the TX mode and that is received from an RX mixer in the RX mode. The TIA creates a voltage output with a programmable gain and filter bandwidth. The TIA supports dual input portions or paths in a first stage to satisfy or meet different input common-mode voltage requirements driven by the DAC of the TX path and the RX mixer of the RX path. The output portion or path of a second stage of the TIA can be used for TX and RX modes.

In some aspects, the BQ filter takes a voltage input from the output of the TIA. The BQ filter can be used for TX and RX modes. The BQ filter creates a voltage output with a programmable gain and filter bandwidth. This programmable gain and filter bandwidth may be tuned separately for the TX and RX modes. The BQ filter drives the R-attenuator in the TX mode and the PGA in the RX mode. The R-attenuator and the PGA can each provide a programmable gain. The PGA can further provide a high-frequency bandwidth to improve anti-aliasing for the ADC of the RX path. Outside a boundary of the analog filter, the R-attenuator can drive a frequency upconverter (FUPC) of the transmit chain, and the PGA can drive the ADC of the receive chain.

In aspects, the gain and bandwidth of each component can be separately tuned for TX and RX modes, as well as separately for each bandwidth mode. Analog switches that are used for programmable gain and bandwidth selection for each of the TX and RX modes can also be employed for TX-to-RX and RX-to-TX switching. For example, switches that are used to establish the programmable gain of the PGA and the R-attenuator can be "reused" to isolate the RX output path in the TX mode and the TX output path in the RX mode. Thus, no additional switches need be added to implement the TX-RX shared analog filter structure.

In some aspects, each of the amplifying components (e.g., the TIA, BQ filter, and PGA) can be reconfigured for enhanced performance and power consumption separately for the TX and RX modes. In some cases, the BQ filter can be bypassed to enable a higher bandwidth for the analog filter—e.g., for a digital predistortion (DPD) receive mode. The PGA output impedance can be programmed to adjust a resonance impedance peak, which can shorten a settling time of the PGA when a sampling switch of the ADC is closed. Further, one or two additional high frequency poles, such as one pole at the input of the BQ filter for transmit and receive signal processing and another pole with the PGA for receive signal processing, can be added to improve aggregate adjacent channel interference (AACI).

In additional aspects, communication components for a transmit chain and a receive chain as described herein can be placed in multiple test modes. For instance, the output of the BQ filter can be configured as a high impedance node, and the PGA can accept an input voltage from equipment (e.g., external equipment) to allow the ADC to be tested with a high sampling rate. Also, the PGA output path can be programmed to drive an off-chip load instead of the ADC to provide for RX-path testing that excludes the ADC. Further, a standalone filter test can be performed by changing the DAC input (e.g., using a built-in self-test (BIST) pattern or an automated testing equipment (ATE) pattern) and then injecting the resulting DAC current into the filter circuit. As part of the standalone filter test, the PGA output voltage can be routed off-chip for external observation or routed to the ADC for on-chip analysis in a digital-in/digital-out modality.

Thus, in these manners, a single analog filter can support TX mode and RX mode operations while occupying an area comparable to an RX-mode-only filter. The transmit portion of the input stage of the amplifier and a, e.g., passive attenuator for the transmit path jointly consume a relatively small percentage of the entire filter area. The filter topology can have a highly reconfigurable structure without compromising functional performance in TX and RX modes. Isolation can be maintained between the TX and RX chains at the input path and at the output path of the shared filter circuit. Gain programmability can be supported for each of the components providing filtering functionality, which programmability can be useful for tuning the RX and TX gain lookup table (LUT) or tables.

Further, the filter circuit can provide programmable RX-DPD mode configurations. For instance, the BQ filter can be bypassed for higher bandwidth. One or more high-frequency poles can also be programmed. Example poles include one from the BQ filter and another from the PGA. The PGA can have an adjustable PGA-ADC resonance peak for fast ADC input tracking. Additionally, the filter circuit topology can support multiple testing features or modes without requiring separate test-purpose circuitry. Example tests include an ADC standalone test, an analog filter standalone test (with ADC or without ADC), and an RX path test without the ADC.

DESCRIPTION EXAMPLES

FIG. 1 illustrates an example environment 100 with at least one electronic device 102 that has a wireless interface device 120, which includes a transceiver 126 having least one filter circuit 130. This document describes example implementations of a filter circuit 130 that can be incorporated into a transceiver 126 (as shown by way of example only), into a radio-frequency front-end 128, or into another portion of an apparatus, such as an electronic device 102. Two examples of an electronic device 102 are explicitly depicted: a mobile phone electronic device 102-1 and an access point electronic device 102-2. As described below, a customer premises equipment (CPE) and a base station 104 are also examples of an electronic device 102. A filter circuit 130 that is shared between a transmit chain and a receive chain can be implemented in these and other types of electronic devices.

In FIG. 1, the mobile phone electronic device 102-1 is depicted as a smartphone, and the access point electronic device 102-2 is depicted as a Wi-Fi® access point suitable for home or commercial use. An electronic device 102, however, may be implemented as any suitable computing or other electronic device. Examples of an apparatus that can be realized as an electronic device 102 include a cellular base station, broadband router, access point, cellular or mobile phone, gaming device, navigation device, media device, laptop computer, desktop computer, tablet computer, and server computer. Other examples of an apparatus that can be realized as an electronic device 102 include a network-attached storage (NAS) device, smart appliance, vehicle-based communication system, Internet of Things (IoT) device, sensor or security device, asset tracker, fitness management device, wearable device such as intelligent glasses or smartwatch, wireless power device (transmitter or receiver), medical device, and so forth. An electronic device 102 may be referred to with different terminology, such as a user equipment (UE) or a customer premises equipment (CPE).

In the environment 100, the access point electronic device 102-2 can communicate with the mobile phone electronic device 102-1 with a wireless link 106-2. The base station 104 can communicate with the access point electronic device 102-2 with a wireless link 106-3. Further, the mobile phone electronic device 102-1 can communicate with the base station 104 through a wireless link 106-1. Generally, a base station 104 communicates with an electronic device 102 via a wireless link 106, which may be implemented as any suitable type of wireless link that carries a communication signal.

Although depicted as a base station tower of a cellular radio network, the base station 104 may represent or be implemented as another device, such as a satellite, terrestrial broadcast tower, access point, peer-to-peer device, mesh network node, fiber optic line interface, another electronic device as described above generally, and so forth. Hence, a wireless link 106 can extend between the electronic device 102 and the base station 104 in any of various manners. Although certain example aspects are described below in terms of the base station 104 and/or the mobile phone electronic device 102-1, the components, communications, and principles are applicable to the access point electronic device 102-2 and/or to communications between the access point electronic device 102-2 and the mobile phone electronic device 102-1 or the base station 104.

The wireless link 106 can include a downlink of data or control information communicated from the base station 104 to the electronic device 102. The wireless link 106 can also include an uplink of other data or control information communicated from the electronic device 102 to the base station 104. The wireless link 106 may be implemented using any suitable wireless communication protocol or standard. Examples of such protocols and standards include a $3^{rd}$ Generation Partnership Project (3GPP) Long-Term Evolution (LTE) standard, such as a $4^{th}$ Generation (4G), a 5th Generation (5G), or a $6^{th}$ Generation (6G) cellular standard; an IEEE 802.11 standard, such as 802.11g, ac, ax, ad, aj, or ay standard (e.g., Wi-Fi® 6 or WiGig®); an IEEE 802.16 standard (e.g., WiMAX®); a Bluetooth® standard; an ultra-wideband (UWB) standard (e.g., IEEE 802.15.4); and so forth. In some implementations, the wireless link 106 may provide power wirelessly, and the electronic device 102 or the base station 104 may comprise a power source or a power sink.

As shown for some implementations, the electronic device 102 can include at least one application processor 108 and at least one computer-readable storage medium 110 (CRM 110). The application processor 108 may include any type of processor, such as a central processing unit (CPU) or a multi-core processor, that is configured to execute processor-executable instructions (e.g., code) stored by the CRM 110. The CRM 110 may include any suitable type of data storage media, such as volatile memory (e.g., random-access memory (RAM)), non-volatile memory (e.g., Flash memory), optical media (e.g., a disc), magnetic media (e.g., a disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include one or more input/output ports 116 (I/O ports 116) and at least one display 118. The I/O ports 116 enable data exchanges or interaction with other devices, networks, or users. The I/O ports 116 may include serial ports (e.g., universal serial bus (USB®) ports), parallel ports, network ports (e.g., Ethernet ports), audio ports, infrared (IR) ports, camera or other sensor ports, and so forth. The display 118 can be realized as a display screen or a projection that presents graphical images provided by other components of the electronic device 102, such as a user interface (UI) associated with an operating system, program, or application. Alternatively or additionally, the display 118 may be implemented as a display port or virtual interface through which graphical content of the electronic device 102 is communicated or presented. In some cases, such as with an example access point electronic device 102-2, the display 118 may include one or more light-emitting diodes or the like.

The electronic device 102 further includes at least one wireless interface device 120 and at least one antenna 122. The example wireless interface device 120 provides connectivity to respective networks and peer devices via a wireless link, which may be configured similarly to or differently from the wireless link 106. The wireless interface device 120 may facilitate communication over any suitable type of wireless network, such as a wireless local area network (LAN) (WLAN), wireless personal-area-network (PAN) (WPAN), peer-to-peer (P2P) network, mesh network, cellular network, wireless wide-area-network (WAN) (WWAN), and/or navigational network (e.g., the Global Positioning System (GPS) of North America or another Satellite Positioning System (SPS) or Global Navigation Satellite System (GNSS)). In the context of the example environment 100, the electronic device 102 can communicate various data and control information bidirectionally with the base station 104 via the wireless interface device 120. The electronic device 102 may, however, communicate directly with other peer devices, an alternative wireless network, an access point, and the like. Also, as described above, an electronic device 102 may alternatively be implemented as a base station 104, an access point electronic device 102-2, or another apparatus as set forth herein.

As shown in FIG. 1, the wireless interface device 120 can include at least one communication processor 124, at least one transceiver 126, and at least one radio-frequency front-end 128 (RFFE 128). These components process data information, control information, and signals associated with communicating information for the electronic device 102 via the antenna 122. The communication processor 124 may be implemented as at least part of a system-on-chip (SoC), as a modem processor, or as a baseband radio processor (BBP) that enables a digital communication interface for data, voice, messaging, or other applications of the electronic device 102. The communication processor 124 can include a digital signal processor (DSP), at least one controller, or one or more signal-processing blocks (not shown) for encoding and modulating data for transmission and for demodulating and decoding received data. Additionally, the communication processor 124 may also manage (e.g., control or configure) aspects or operation of the transceiver 126, the RF front-end 128, and other components of the wireless interface device 120 to implement various communication protocols or communication techniques.

In some cases, the application processor 108 and the communication processor 124 can be combined into one module or integrated circuit (IC), such as an SoC. Regardless, the application processor 108, the communication processor 124, or a processor generally can be operatively coupled to one or more other components, such as the CRM 110 or the display 118, to enable control of, or other interaction with, the various components of the electronic device 102. For example, at least one processor 108 or 124 can present one or more graphical images on a display screen implementation of the display 118 based on one or more wireless signals communicated (e.g., transmitted or received) via the at least one antenna 122 using components of the wireless interface device 120. Also, at least one processor 108 or 124 can coordinate transmission of one or more wireless signals using a component of the wireless interface device 120, such as the filter circuit 130. Further, the application processor 108 or the communication processor 124, including a combination thereof, can be realized using digital circuitry that implements logic or functionality that is described herein. Additionally, the communication processor 124 may also include or be associated with a memory (not separately depicted) to store data and processor-executable instructions (e.g., code), such as the same CRM 110 or another CRM.

Although not shown in FIG. 1, the wireless interface device 120 can include at least one mixer circuit for frequency translation, such as frequency up-conversion or frequency down-conversion. For example, the transceiver 126 can include at least one mixer circuit, or the RF front-end 128 can include at least one mixer circuit (including both components can have at least one mixer circuit in accordance with an optional, but permitted herein, "inclusive-or" interpretation of the word "or"). The transceiver 126 can also include circuitry and logic for filtering, switching, amplification, channelization, frequency translation, and so forth.

Frequency translation functionality may include an up-conversion or a down-conversion of frequency that is performed through a single conversion operation (e.g., with a direct-conversion architecture from a baseband (BB) frequency to a radio frequency (RF)) or through multiple conversion operations (e.g., with a superheterodyne architecture from a BB frequency, to an intermediate frequency (IF), and then to a radio frequency). The transceiver 126 can perform such frequency conversion (e.g., frequency translation) by using a mixer circuit and an associated local oscillator (not shown). Generally, the transceiver 126 can include filters, switches, amplifiers, mixers, and so forth for routing and conditioning signals that are transmitted or received via the antenna 122.

In addition to a mixer circuit and/or local oscillator, the transceiver 126 can include an analog-to-digital converter (ADC) or a digital-to-analog converter (DAC) (not shown). In operation, an ADC can convert analog signals to digital signals, and a DAC can convert digital signals to analog signals. Generally, an ADC or a DAC can be implemented as part of the communication processor 124, as part of the transceiver 126, or separately from both (e.g., as another part of an SoC or as part of the application processor 108).

The components or circuitry of the transceiver 126, as well as that of the RF front-end 128, can be implemented in any suitable fashion, such as with combined transceiver logic or separately as respective transmitter and receiver entities. In some cases, the transceiver 126, for instance, is implemented with multiple or different sections to implement respective transmitting and receiving operations (e.g., with separate transmit and receive chains). Although not shown in FIG. 1, the transceiver 126 may include logic to perform in-phase/quadrature (I/Q) operations, such as synthesis, phase correction, modulation, demodulation, and the like. Configurable components of the transceiver 126, such as some phase shifters, an adjustable filter, a variable controlled oscillator (VCO), or a programmable gain amplifier (PGA), may be controlled by the communication processor 124 to implement communications in various modes, with different frequency bands, or using beamforming.

The RF front-end 128 can also include one or more mixers, one or more filters, one or more switches, or one or more amplifiers for conditioning signals received via the antenna 122 or for conditioning signals to be transmitted via the antenna 122. The RF front-end 128 may also include a local oscillator, phase shifter (PS), peak detector, power meter, gain control block, antenna tuning circuit, N-plexer, balun, power coupler, and the like. Configurable components of the RF front-end 128, such as some phase shifters, an adjustable filter, an automatic gain controller (AGC), or a power amplifier with an adjustable amplification, may be controlled by the communication processor 124 to implement communications in various modes, with different frequency bands, or using beamforming. In some implementations, the antenna 122 is implemented as at least one antenna array that includes multiple antenna elements. Thus, as used herein, an "antenna" can refer to at least one discrete or independent antenna, to at least one antenna array that includes multiple antenna elements, or to a portion of an antenna array (e.g., an antenna element), depending on context or implementation.

In example implementations, the wireless interface device 120 includes at least one filter circuit 130. A filter circuit 130 may generally be positioned at the communication processor 124 (e.g., as part of an analog portion thereof-if any), the transceiver 126, the RF front-end 128, and so forth, including by being present at two or more sections or parts of the wireless interface device 120 in some cases. In FIG. 1, a filter circuit 130 is depicted as being part of the transceiver 126 by way of example only. Described implementations of a filter circuit 130 can, additionally or alternatively, be employed in other portions of the wireless interface device 120 or in other parts of the electronic device 102 generally.

In some implementations, the filter circuit 130 can propagate a receive signal 132 in a receive mode and a transmit signal 134 in a transmit mode. The communication processor 124, for instance, can switch usage of the filter circuit 130 between the transmit mode and the receive mode using time-division multiplexing (TDM). The filter circuit 130 may be realized as an analog filter circuit that filters signals in the analog domain. In some cases, the filter circuit 130 can propagate the receive signal 132 and the transmit signal 134 by sharing the filter circuit 130 between transmission and reception. The filter circuit 130 can, for example, be implemented to be shared between a transmit chain and a receive chain in a TDM manner. This document next describes example implementations of a wireless interface device 120 that employs a filter circuit 130 that can be shared between a transmit chain and a receive chain.

Figure 2:
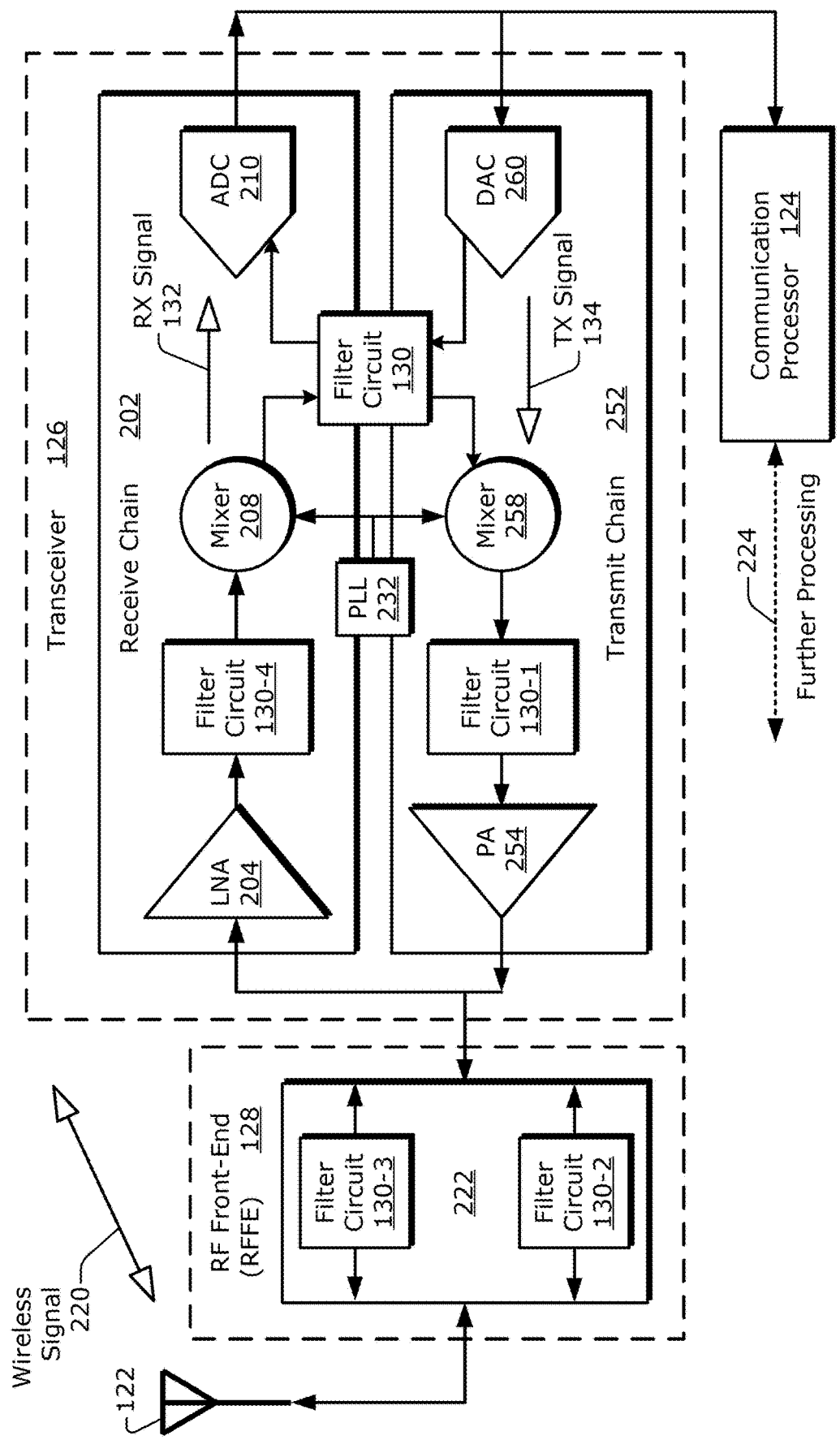
FIG. 2 is a schematic diagram illustrating an example radio-frequency (RF) front-end and an example transceiver that can each include at least one filter circuit.

FIG. 2 is a schematic diagram with circuitry 200 illustrating an example RF front-end 128 and an example transceiver 126 that can each include at least one filter circuit 130. FIG. 2 also depicts an antenna 122 and a communication processor 124. The communication processor 124 communicates one or more data signals to other components, such as the application processor 108 of FIG. 1, for further processing at 224 (e.g., for processing at an application level). As shown, the circuitry 200 can include a filter circuit 130, a filter circuit 130-1, a filter circuit 130-2, a filter circuit 130-3, or a filter circuit 130-4, including one to five of such filter circuits. As explicitly depicted for the filter circuit 130, a filter circuit may be shared between the transmit chain 252 and the receive chain 202. The circuitry 200, however, may include a different quantity of filters (e.g., more or fewer), may include filters that are coupled together differently, may include filters in different locations, and so forth.

As illustrated from left to right, in example implementations, the antenna 122 is coupled to the RF front-end 128, and the RF front-end 128 is coupled to the transceiver 126. The transceiver 126 is coupled to the communication processor 124. The example RF front-end 128 includes at least one signal propagation path 222. The at least one signal propagation path 222 can include at least one filter circuit, such as the filter circuit 130-2 or the filter circuit 130-3. The example transceiver 126 includes at least one receive chain 202 (or receive path 202) and at least one transmit chain 252 (or transmit path 252). Although only one RF front-end 128, one transceiver 126, and one communication processor 124 are shown at the circuitry 200, an electronic device 102, or a wireless interface device 120 thereof, can include multiple instances of any or all such components. Also, although only certain components are explicitly depicted in FIG. 2 and are shown coupled together in a particular manner, the transceiver 126 or the RF front-end 128 may include other non-illustrated components (e.g., switches or diplexers), more or fewer components, differently coupled arrangements of components, and so forth.

In some implementations, the RF front-end 128 couples the antenna 122 to the transceiver 126 via the signal propagation path 222. In operation, the signal propagation path 222 carries a signal between the antenna 122 and the transceiver 126. During or as part of the signal propagation, the signal propagation path 222 conditions the propagating signal, such as with the filter circuit 130-2 or the filter circuit 130-3. This enables the RF front-end 128 to couple a wireless signal 220 from the antenna 122 to the transceiver 126 as part of a reception operation for the receive signal 132 (or reception signal). The RF front-end 128 also enables a transmit signal 134 (or transmission signal) to be coupled from the transceiver 126 to the antenna 122 as part of a transmission operation to emanate a wireless signal 220. Although not explicitly shown in FIG. 2-1, an RF front-end 128, or a signal propagation path 222 thereof, may include one or more other components, such as another filter, an amplifier (e.g., a power amplifier or a low-noise amplifier), an N-plexer, a phase shifter, a diplexer, one or more switches, a directional coupler, and so forth.

In some implementations, the transceiver 126 can include at least one receive chain 202, at least one transmit chain 252, or at least one receive chain 202 and at least one transmit chain 252. From left to right, the receive chain 202 can include a low noise amplifier 204 (LNA 204), the filter circuit 130-4, a mixer 208 for frequency down conversion, at least a portion of the filter circuit 130, and an ADC 210. The transmit chain 252 can include a power amplifier 254 (PA 254), the filter circuit 130-1, a mixer 258 for frequency up-conversion, at least a portion of the filter circuit 130, and a DAC 260. However, the receive chain 202 or the transmit chain 252 can include other components—for example, additional amplifiers or filters, multiple mixers, one or more buffers, or at least one local oscillator—that are electrically or electromagnetically disposed anywhere along the depicted receive and transmit chains.

The receive chain 202 is coupled between the signal propagation path 222 of the RF front-end 128 and the communication processor 124—e.g., via the low-noise amplifier 204 and the ADC 210, respectively. The transmit chain 252 is coupled between the signal propagation path 222 and the communication processor 124—e.g., via the power amplifier 254 and the DAC 260, respectively. The transceiver 126 can also include at least one phase-locked loop 232 (PLL 232) that is coupled to the mixer 208 or the mixer 258. For example, the transceiver 126 can include one PLL 232 for each transmit/receive chain pair, one PLL 232 per transmit chain and one PLL 232 per receive chain, multiple PLLs 232 per chain, and so forth.

As shown along a signal propagation direction for certain example implementations of the receive chain 202, the antenna 122 is coupled to the low noise amplifier 204 via the signal propagation path 222 and the filter circuit 130-3 thereof. The low-noise amplifier 204 is coupled to the filter circuit 130-4. The filter circuit 130-4 is coupled to the mixer 208, and the mixer 208 is coupled to the ADC 210 via the filter circuit 130. Thus, the filter circuit 130 can be coupled between the mixer 208 and the ADC 210 along the receive chain 202. The ADC 210 is in turn coupled to the communication processor 124.

As shown along a signal propagation direction for certain example implementations of the transmit chain 252, the communication processor 124 is coupled to the DAC 260, and the DAC 260 is coupled to the mixer 258 via the filter circuit 130. Thus, the filter circuit 130 can be coupled between the DAC 260 and the mixer 258 along the transmit chain 252. The mixer 258 is coupled to the filter circuit 130-1, and the filter circuit 130-1 is coupled to the power amplifier 254. The power amplifier 254 is coupled to the antenna 122 via the signal propagation path 222 using the filter circuit 130-2 thereof.

Although only one receive chain 202 and one transmit chain 252 are explicitly shown, an electronic device 102, a wireless interface device 120 thereof, or a transceiver 126 thereof, can include multiple instances of either or both components. Further, although the receive chain 202 and the transmit chain 252 are depicted as being part of the transceiver 126, a receive chain 202 or a transmit chain 252 may extend into the communication processor 124 or the RF front-end 128, including extending into both. Additionally or alternatively, a given receive chain 202 or a transmit chain 252 can be present within, e.g., the RF front-end 128 and a different receive chain 202 or transmit chain 252 can be present within the transceiver 126. Although the ADC 210 and the DAC 260 are illustrated as being separately coupled to the communication processor 124, they may share a bus or other means for communicating with the processor 124. Further, the ADC 210 or the DAC 260 may be part of the communication processor 124 or separate from the transceiver 126 and the communication processor 124.

As part of an example signal-receiving operation, the filter circuit 130-3 of the signal propagation path 222 filters a received signal and forwards the filtered signal to the low-noise amplifier 204. The low-noise amplifier 204 accepts the filtered signal from the RF front-end 128 and provides an amplified signal to the filter circuit 130-4 based on the accepted signal. The filter circuit 130-4 filters the amplified signal and provides another filtered signal to the mixer 208. The mixer 208 performs a frequency conversion operation on the other filtered signal to down-convert from one frequency to a lower frequency (e.g., from a radio frequency (RF) to an intermediate frequency (IF), from an IF to a baseband frequency (BBF), or from RF "directly" to BBF). The at least one mixer 208 can perform the frequency down-conversion in a single conversion step or through multiple conversion steps using at least one PLL 232. The mixer 208 may be referred to as a frequency downconverter 208 (FDNC 208) herein. The mixer 208 can provide a down-converted signal to the filter circuit 130, which further filters the receive signal 132. The shared filter circuit 130 forwards the filtered receive signal to the ADC 210. The ADC 210 can convert the filtered receive signal to a digital signal and forward the digital signal to the communication processor 124.

As part of an example signal-transmitting operation, the filter circuit 130 accepts from the DAC 260 an analog signal at BBF (or at IF if an intervening frequency upconverter is present (not shown)), with the analog signal corresponding to the transmit signal 134. The shared filter circuit 130 filters the transmit signal 134 and provides a filtered transmit signal to the mixer 258. The mixer 258 upconverts the filtered signal to a higher frequency, such as to an RF frequency, to produce an RF signal using a signal generated by the PLL 232 to have a target synthesized frequency. The mixer 258 provides the RF or other upconverted signal to the filter circuit 130-1. The filter circuit 130-1 filters the RF signal and provides a filtered signal to the power amplifier 254. Thus, after the filtering by the filter circuit 130-1, the power amplifier 254 amplifies the filtered signal and provides an amplified signal to the signal propagation path 222 for signal conditioning. The RF front-end 128 can use, for instance, the filter circuit 130-2 of the signal propagation path 222 to provide a filtered signal to the antenna 122 for emanation as a wireless signal 220.

Example implementations of a shared filter circuit 130, as described herein, may be employed at the depicted position between a mixer 208 and an ADC 210 and between a DAC 260 and a mixer 258 at a BBF, an IF, or an RF. However, any one or more of the example filter circuits 130-1, 130-2, 130-3, or 130-4 in the transceiver 126 or the RF front-end 128 or at other filters of an electronic device 102 (not shown in FIG. 2) may be employed as a filter circuit 130 that is shared between a receive chain 202 and a transmit chain 252. The circuitry 200, however, depicts just some examples for a transceiver 126 and/or an RF front-end 128.

In some cases, the various components that are illustrated in the drawings using separate schematic blocks or circuit elements may be manufactured or packaged in different discrete manners. For example, one physical module may include components of the RF front-end 128 and some components of the transceiver 126, and another physical module may combine the communication processor 124 with the remaining components of the transceiver 126. Further, in some cases, the antenna 122 may be co-packaged with at least some components of the RF front-end 128 or the transceiver 126 (e.g., as an antenna module). In alternative implementations, one or more components may be physically or logically "shifted" to a different part of the wireless interface device 120 as compared to the illustrated circuitry 200 and/or may be incorporated into a different module. For example, a low-noise amplifier 204 or a power amplifier 254 may alternatively or additionally be deployed in the RF front-end 128.

Figure 3:
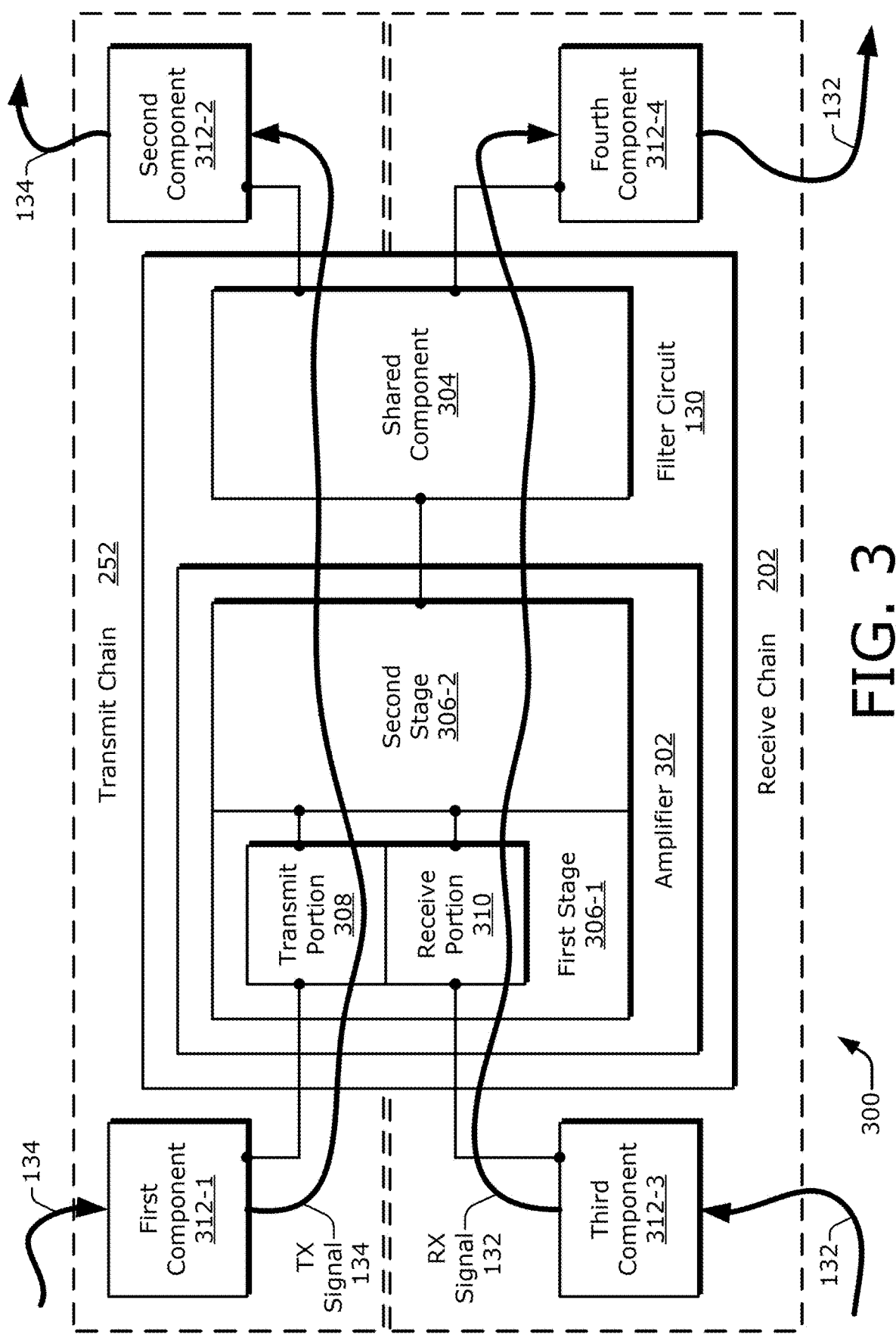
FIG. 3 is a schematic diagram illustrating an example filter circuit that includes an amplifier and another component and that can be shared by a transmit chain and a receive chain.

FIG. 3 is a schematic diagram 300 illustrating an example filter circuit 130 that can include an amplifier 302 and another component 304 and that can be shared by a transmit chain 252 and a receive chain 202. The transmit chain 252 and the receive chain 202 can be located in, or be part of, any portion of a wireless interface device 120 (e.g., of FIGS. 1 and 2). The wireless interface device 120 can include multiple components 312-1 . . . 312-C ("312-C" not shown), with "C" representing a positive integer. In example implementations, the transmit chain 252 can include a first component 312-1 and a second component 312-2. The receive chain 202 can include a third component 312-3 and a fourth component 312-4. The filter circuit 130 can include the amplifier 302 and the shared component 304. The amplifier 302 may include multiple stages 306-1 . . . 306-S ("306-S" not shown), with "S" representing a positive integer. For example, the amplifier 302 can include two, three, or more stages.

Thus, the amplifier 302 can include a first stage 306-1 and a second stage 306-2 as explicitly depicted in FIG. 3. In some cases, but by way of example only, the first stage 306-1 can realize an input stage for the amplifier 302, and the second stage can realize an output stage for the amplifier 302. In some of such cases, one or more intermediate stages may be coupled between the first stage 306-1 and the second stage 306-2. The first stage 306-1 can include a transmit portion 308 and a receive portion 310. The transmit portion 308 may be coupled to the second stage 306-2, and the receive portion 310 may be coupled to the second stage 306-2. As shown, the transmit portion 308 and the second stage 306-2 can be coupled together in series between the first component 312-1 and the second component 312-2 of the transmit chain 252. The receive portion 310 and the second stage 306-2 can be coupled together in series between the third component 312-3 and the fourth component 312-4 of the receive chain 202. In some cases, the amplifier can be implemented using a transimpedance amplifier (TIA).

The filter circuit 130 can include one or more other shared components, such as the depicted shared component 304. Examples of a shared component 304, such as a biquad filter, are described below. Although not so depicted in FIG. 3, in addition to the filter circuit 130 being shareable between the receive chain 202 and the transmit chain 252, a given component 312, such as an antenna, may be part of the receive chain 202 and the transmit chain 252.

In some implementations, a wireless interface device 120 (e.g., of FIGS. 1 and 2) can be configured to share the filter circuit 130 between the transmit chain 252 and the receive chain 202 using time-division multiplexing (TDM). For example, the wireless interface device 120 can share the filter circuit 130 between the transmit chain 252 and the receive chain 202 by propagating transmit and receive signals in respective transmit and receive modes at different times or in different time slots. For instance, the wireless interface device 120 may propagate a transmit signal 134 through the transmit portion 308 of the first stage 306-1 of the amplifier 302 and through the second stage 306-2 of the amplifier 302 during a transmit mode. Similarly, the wireless interface device 120 may propagate a receive signal 132 through the receive portion 310 of the first stage 306-1 of the amplifier 302 and through the second stage 306-2 of the amplifier 302 during a receive mode.

In some cases, as described herein, the receive portion 310 of the first stage 306-1 can be tuned to accept the receive signal 132 from the third component 312-3 of the receive chain 202. Similarly, the transmit portion 308 of the first stage 306-1 can be tuned to accept the transmit signal 134 from the first component 312-1 of the transmit chain 252. The second stage 306-2 of the amplifier 302, in conjunction with at least one shared component 304 (if present) of the filter circuit 130, can process the receive signal 132 and the transmit signal 134 in a time-duplexed manner (e.g., at different times) "after" (from a signal flow perspective) the first stage 306-1 has processed the receive signal 132 and the transmit signal 134 using respective non-shared portions. It should be understood that the first stage 306-1 and the second stage 306-2 of the amplifier 302 may each process a signal simultaneously; however, for a given instantaneous moment or temporal segment of the signal, the first stage 306-1 can process that moment or segment of the signal prior to when the second stage 306-2 processes that moment or segment.

As shown, the transmit portion 308 of the first stage 306-1 is coupled between the first component 312-1 of the transmit chain 252 and the second stage 306-2 of the amplifier 302. The first component 312-1 can be realized as an upstream transmit component, at least relative to the filter circuit 130. The second component 312-2 can be realized as a downstream transmit component, at least relative to the filter circuit 130. As used herein, "upstream" and "downstream" are terms that relate to a signal flow direction or propagation of a signal. Regarding transmit components that are part of the transmit chain 252, one component that is upstream of another component is positioned farther to the left because the transmit signal 134 is illustrated as flowing from the left to the right in FIG. 3. For example, the transmit portion 308 of the amplifier 302 is upstream of the shared component 304. On the other hand, the second component 312-2 is downstream of the filter circuit 130.

With respect to the receive portion 310 of the first stage 306-1, the receive portion 310 is coupled between the third component 312-3 of the receive chain 202 and the second stage 306-2 of the amplifier 302. The third component 312-3 can be realized as an upstream receive component, at least relative to the filter circuit 130. The fourth component 312-4 can be realized as a downstream receive component, at least relative to the filter circuit 130. Regarding receive components that are part of the receive chain 202, one component that is downstream of another component is positioned farther to the right because the receive signal 132 is illustrated as flowing from the left to the right in FIG. 3. For example, the shared component 304 is downstream of the second stage 306-2 of the amplifier 302. Additionally, the second stage 306-2 of the amplifier 302 is downstream of the first stage 306-1 of the amplifier 302 in the illustrated example. On the other hand, the receive portion 310 of the first stage 306-1 is upstream of the fourth component 312-4.

Some example upstream and downstream components, at least relative to the filter circuit 130, are described next. An upstream transmit component can include at least part of a communication processor 124 (e.g., of FIGS. 1 and 2). A downstream transmit component can include at least one antenna 122. An upstream receive component can include at least one antenna 122. The at least one antenna 122 of the upstream receive component can be the same antenna or a different antenna as compared to the at least one antenna 122 of the downstream transmit component. A downstream receive component can include at least part of a communication processor 124. The communication processor 124 of the upstream transmit component can be the same communication processor or a different communication processor (or portion thereof) relative to the communication processor 124 of the downstream receive component. Accordingly, in at least some cases, an upstream transmit component of the transmit chain 252 can correspond to (e.g., have at least partially overlapping circuitry or related functionality with) a downstream receive component of the receive chain 202. Similarly, in at least some cases, a downstream transmit component of the transmit chain 252 can correspond to (e.g., have at least partially overlapping circuitry or related functionality with) an upstream receive component of the receive chain 202.

Figure 4:
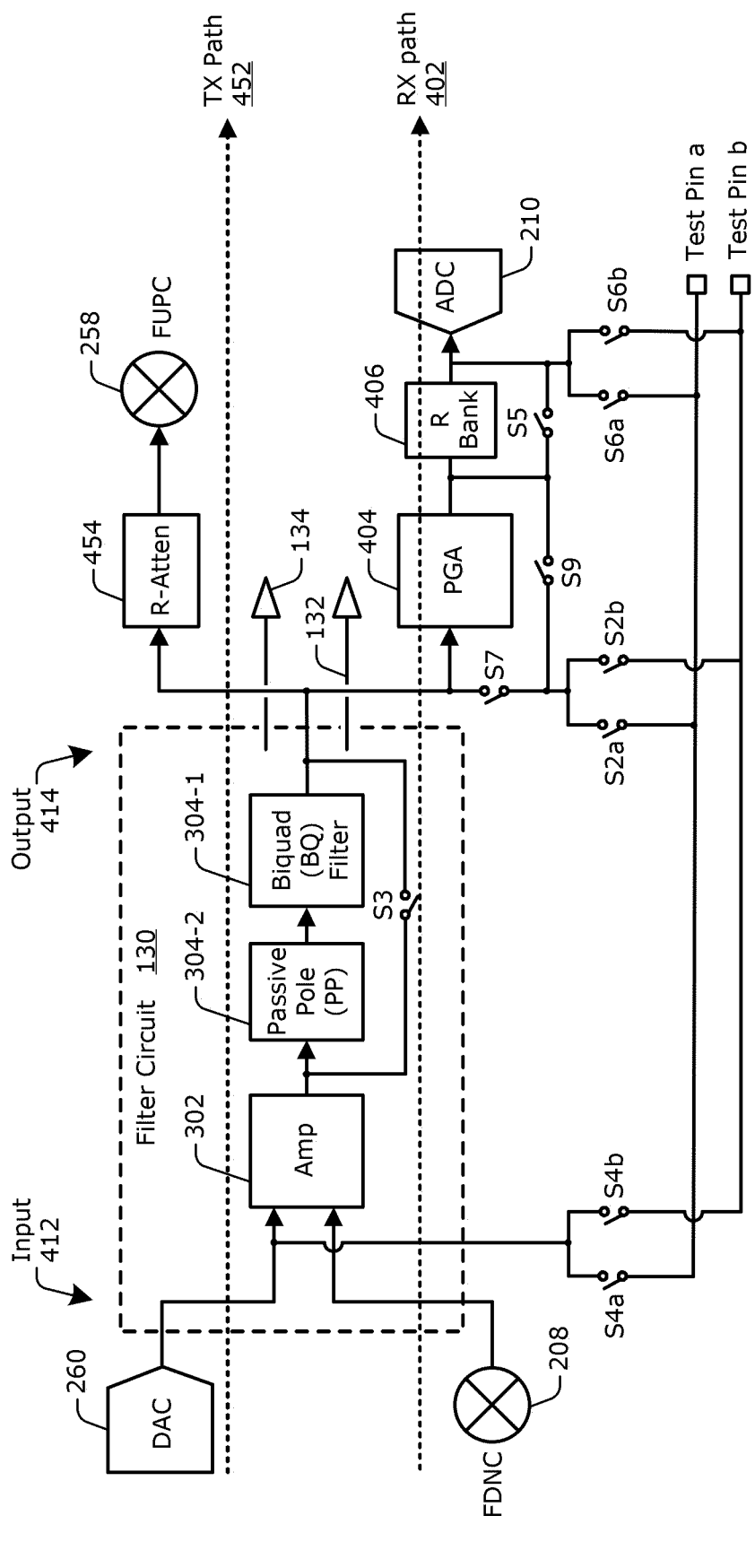
FIG. 4 is a schematic diagram of example communication components illustrating an example filter circuit (e.g., like that of FIG. 3) that is coupled to multiple components that are part of a transmit path or receive path.

The multiple components 312-1 to 312-4 can be realized with different upstream or downstream components for the transmit chain 252 and the receive chain 202 than those described above. Other examples for the multiple components 312-1 to 312-4 are provided next and described further below. For example, the first component 312-1 can include a digital-to-analog converter 260 (DAC 260) as illustrated in FIGS. 2 and 4. The second component 312-2 can include a frequency upconverter 258 (FUPC 258) as illustrated in FIG. 4 with at least one mixer, which is depicted in FIG. 2 as the mixer 258. The third component 312-3 can include a frequency downconverter 208 (FDNC 208) as illustrated in FIG. 4 with at least one mixer, which is depicted in FIG. 2 as the mixer 208. The fourth component 312-4 can include an analog-to-digital converter 210 (ADC 210) as illustrated in FIGS. 2 and 4.

In some implementations, an attenuator, such as a resistive attenuator (R-attenuator), can be coupled between the amplifier 302 of the filter circuit 130 and a frequency upconverter 258 that is realized as at least part of the second component 312-2. The resistive attenuator (e.g., an R-attenuator 454 of FIG. 4) may include multiple resistors coupled to one or more switches. A programmable gain amplifier (e.g., a PGA 404 of FIG. 4) can be coupled between the amplifier 302 of the filter circuit 130 and the analog-to-digital converter 210, with the programmable gain amplifier including at least one switch. The shared component 304 can be realized with at least one biquad filter (e.g., a biquad filter 304-1 of FIG. 4). These other components are described further below, including next with reference to FIG. 4.

FIG. 4 is a schematic diagram 400 of example communication components illustrating an example filter circuit 130 (e.g., like that of FIG. 3) that is coupled to multiple components that are part of an example transmit path 452 or an example receive path 402. The transmit path 452 (TX path 452) may follow or correspond to at least part of the transmit chain 252 (of FIGS. 2 and 3) and propagate the transmit signal 134. The receive path 402 (RX path 402) may follow or correspond to at least part of the receive chain 202 (of FIGS. 2 and 3) and propagate the receive signal 132.

In example implementations, the filter circuit 130 includes one or more shared components, which can be shared between the transmit path 452 and the receive path 402. The filter circuit 130 can be realized as, for instance, a low-pass filter—e.g., to attenuate a jammer in an RX mode or DAC image in a TX mode. The filter circuit 130 can include an input 412 and an output 414. The amplifier 302 can be coupled to the input 412 of the filter circuit 130.

The at least one shared component 304 (of FIG. 3) can be coupled to the output 414 of the filter circuit 130 and may include at least a biquad filter 304-1 (BQ filter 304-1). The biquad filter 304-1 can provide, e.g., two high-frequency poles; the biquad filter 304-1 can be a second order filter (e.g., to provide 12 dB per octave attenuation at the passband). A filter of any order, however, may be used for a filter 304-1 instead of a biquad filter 304-1 or in conjunction with a biquad filter (e.g., in series with a biquad filter). The biquad filter 304-1 can be implemented as a multi-feedback (MFB) biquad filter, for instance. The at least one shared component 304 can also or instead include at least one passive pole 304-2 (PP 304-2), such as circuitry to create a pole in the frequency response of the filter circuit 130. The passive pole 304-2 can be tuned to create high frequency attenuation to support a targeted order of filtering (e.g., to support third-order filtering of the amplifier 302 and the biquad filter 304-1 at higher frequencies or to produce a fourth-order filtering response). As shown, the passive pole 304-2 can be coupled between the amplifier 302 and the biquad filter 304-1. The passive pole 304-2 can, however, be coupled to the biquad filter 304-1 on a side thereof that is opposite that of the amplifier 302 or be incorporated into the biquad filter 304-1.

The amplifier 302 can be realized, for example, using at least one transimpedance amplifier (TIA) that converts a current-based signal to a voltage-based signal. If realized as a transimpedance amplifier, the gain of the TIA may be proportional to a feedback resistance (e.g., with an input current and an output voltage, the gain can equal the resistance). Generally, the amplifier 302 may have a unitary gain or a nonunitary gain, including a gain that is less than or greater than one. The amplifier 302 can be implemented with any order (e.g., as a first-order filter). If the amplifier 302 is a first-order filter, and the biquad filter 304-1 is a second-order filter, for example, these two components can jointly provide a third-order filter response.

Although the transmit path 452 can extend farther upstream or downstream than is illustrated in FIG. 4 (e.g., as is depicted in FIGS. 2 and 3 with regard to the transmit chain 252), the transmit path 452 is shown in FIG. 4 to "start" with the DAC 260 and to "end" with the frequency upconverter 258. The filter circuit 130 can be coupled between the DAC 260 and the frequency upconverter 258. The DAC 260 may be implemented, for example, with a current-steering DAC (IDAC) that provides a current-based signal to the amplifier 302, such as if the amplifier 302 is realized as a transimpedance amplifier. The transmit path 452 can include one or more other illustrated or unillustrated components.

An example of another component of the transmit path 452 is an attenuator, such as a resistive attenuator 454 (R-attenuator 454). As shown, the R-attenuator 454 can be coupled between the filter circuit 130 and the frequency upconverter 258. The R-attenuator 454 can be implemented as a voltage-to-current (V2I) R-attenuator and may be passive or active. If a passive resistive attenuator 454, for example, the signal may be attenuated as a gain control mechanism; thus, the resistive attenuator 454 can provide gain programmability by scaling the current using one or more resistors. For instance, at a maximum attenuation of the resistive attenuator 454, the resulting transmit signal 134 has a minimum magnitude. Such a V2I implementation of the R-attenuator 454 can convert a voltage-mode signal received from the filter circuit 130 to a current-mode signal, which is appropriate for a current-based mixer of the frequency upconverter 258. The frequency upconverter 258 may, however, employ a voltage-based mixer such that the R-attenuator 454 can omit a V2I functionality (e.g., operate in a voltage-to-voltage (V2V) manner).

Although the receive path 402 can extend upstream or downstream farther than is illustrated in FIG. 4 (e.g., as is depicted in FIGS. 2 and 3 with regard to the receive chain 202), the receive path 402 is shown in FIG. 4 to "start" with the frequency downconverter 208 and to "end" with the ADC 210. The filter circuit 130 can be coupled between the frequency downconverter 208 and the ADC 210. The receive path 452 can further include one or more other illustrated or unillustrated components.

Examples of other components of the receive path 402 include a programmable gain amplifier 404 (PGA 404) and a resistor bank 406 (R bank 406). The programmable gain amplifier 404 can provide gain programmability (e.g., automatic gain control (AGC)) in a receive mode. The programmable gain amplifier 404 can be coupled between the filter circuit 130 and the ADC 210. The resistor bank 406 can be coupled between the filter circuit 130 and the ADC 210. In some cases, the resistor bank 406 is coupled between the programmable gain amplifier 404 and the ADC 210.

As shown, the biquad filter 304-1 can be coupled between the amplifier 302 and the resistive attenuator 454 along the transmit chain and between the amplifier 302 and the programmable gain amplifier 404 along the receive chain. Thus, if the biquad filter 304-1 provides an output signal for the filter circuit 130, the programmable gain amplifier 404 can accept the receive signal 132 from the biquad filter 304-1, and the resistive attenuator 454 can accept the transmit signal 134 from the biquad filter 304-1.

In aspects, the resistive attenuator 454 of the TX path 452 can be coupled between the amplifier 302 of the filter circuit 130 and the frequency upconverter 258. The resistive attenuator 454 can provide filtering functionality for the transmit signal 134. In some cases, the resistive attenuator 454 can function as an adjunct or ancillary filtering component, which is not shared with the RX path 402, of the filter circuit 130. In other cases, the resistive attenuator 454 can be considered to be separate from the filter circuit 130.

The resistive attenuator 454 may include multiple resistors coupled to one or more switches (not shown). Setting the one or more switches to an open state or a closed state can adjust an amount or level of attenuation that the resistive attenuator 454 applies to the transmit signal 134 as received from the filter circuit 130. Thus, control circuitry (not separately shown), such as that of a communication processor 124 (e.g., of FIGS. 1 and 2), can use the one or more switches of the resistive attenuator 454 to establish an attenuation factor of the attenuator in a transmit mode. In a receive mode, the control circuitry can use the one or more switches to isolate the attenuator from the filter circuit 130 or from the programmable gain amplifier 404 of the receive path 402, including from the filter circuit 130 and the programmable gain amplifier 404.

In aspects, the programmable gain amplifier 404 can be coupled between the amplifier 302 of the filter circuit 130 and the analog-to-digital converter 210. The programmable gain amplifier 404 can provide filtering functionality for the receive signal 132. In some cases, the programmable gain amplifier 404 of the RX path 402 can function as an adjunct or ancillary filtering component, which is not shared with the TX path 452, of the filter circuit 130. In other cases, the programmable gain amplifier 404 can be separate from the filter circuit 130.

The programmable gain amplifier 404 may include at least one switch (not shown). Setting the at least one switch to an open state or a closed state can adjust an amount or level of gain that the programmable gain amplifier 404 applies to the receive signal 132 as received from the filter circuit 130. The gain may be unitary or nonunitary. If nonunitary, the gain may be less than one or greater than one. Thus, control circuitry, such as that of a communication processor 124, can use the at least one switch of the programmable gain amplifier 404 to establish, in a receive mode, a gain factor of the programmable gain amplifier 404. In a transmit mode, the control circuitry can use the at least one switch to isolate the programmable gain amplifier 404 from the filter circuit 130 or from the resistive attenuator 454 of the TX path 452, including from the filter circuit 130 and the resistive attenuator 454.

Thus, in these manners, the resistive attenuator 454 can be isolated from the RX path 402 for the receive mode using one or more switches of the resistive attenuator 454. Similarly, the programmable gain amplifier 404 can be isolated from the TX path 452 for the transmit mode using at least one switch of the programmable gain amplifier 404. In at least some of such cases, this obviates the inclusion of a switch that is dedicated to providing the isolation between the transmit chain 252 and the receive chain 202 on the output side of the filter circuit 130. Instead, a switch that provides other functionality (e.g., setting an attenuation factor or a gain factor) can also provide the isolation functionality.

Figures 1, 7:
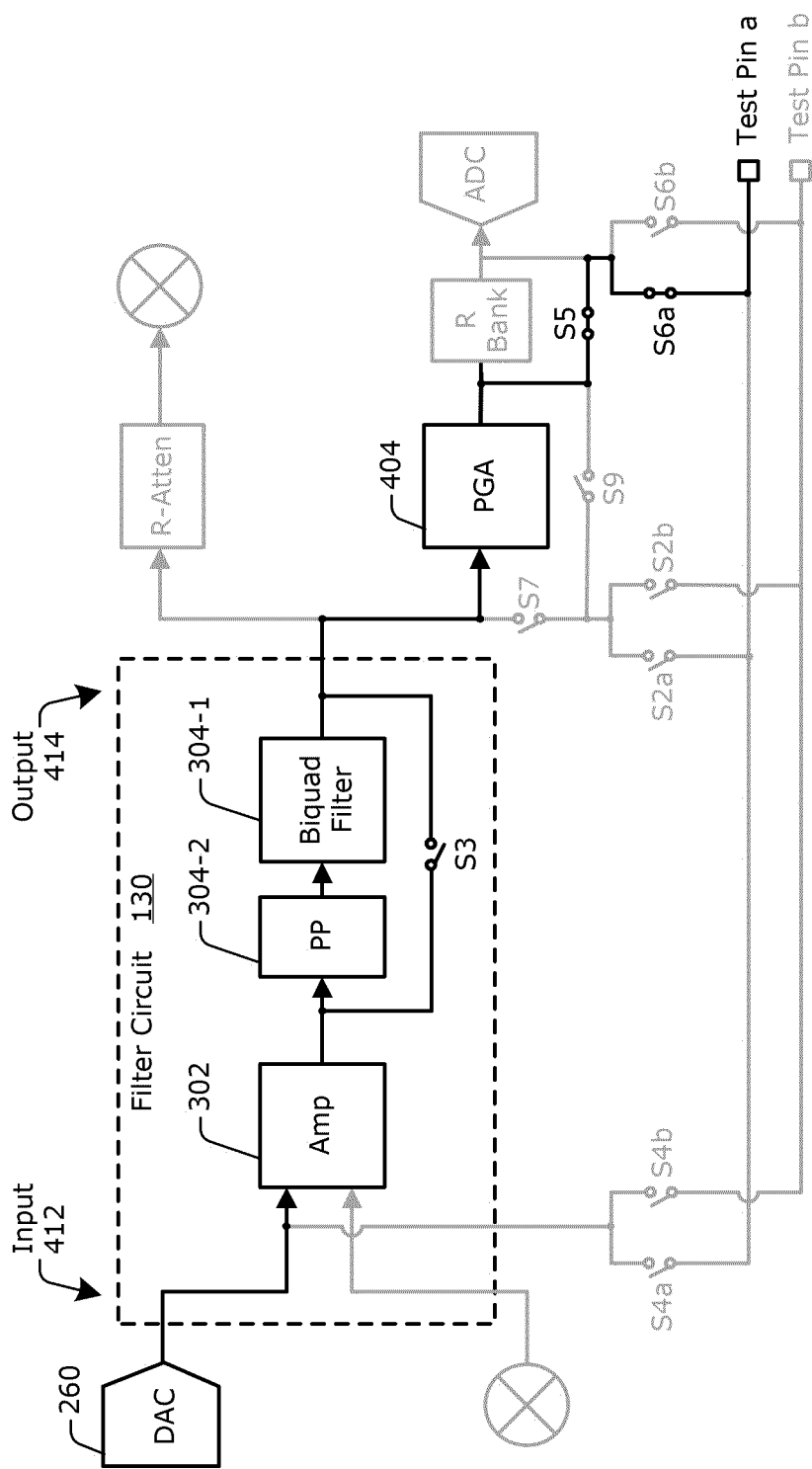
Figures 2, 7:
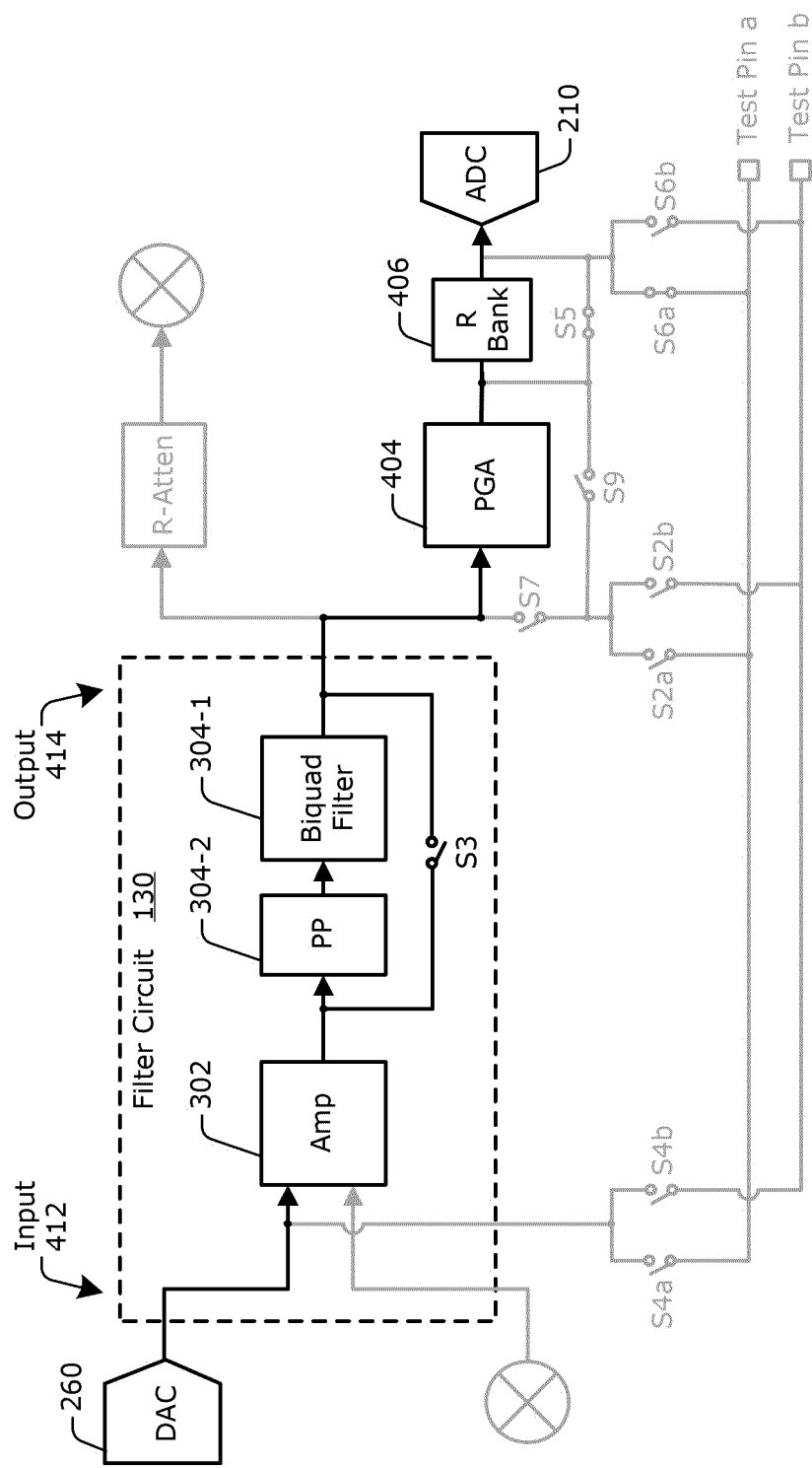
Figures 3, 7:
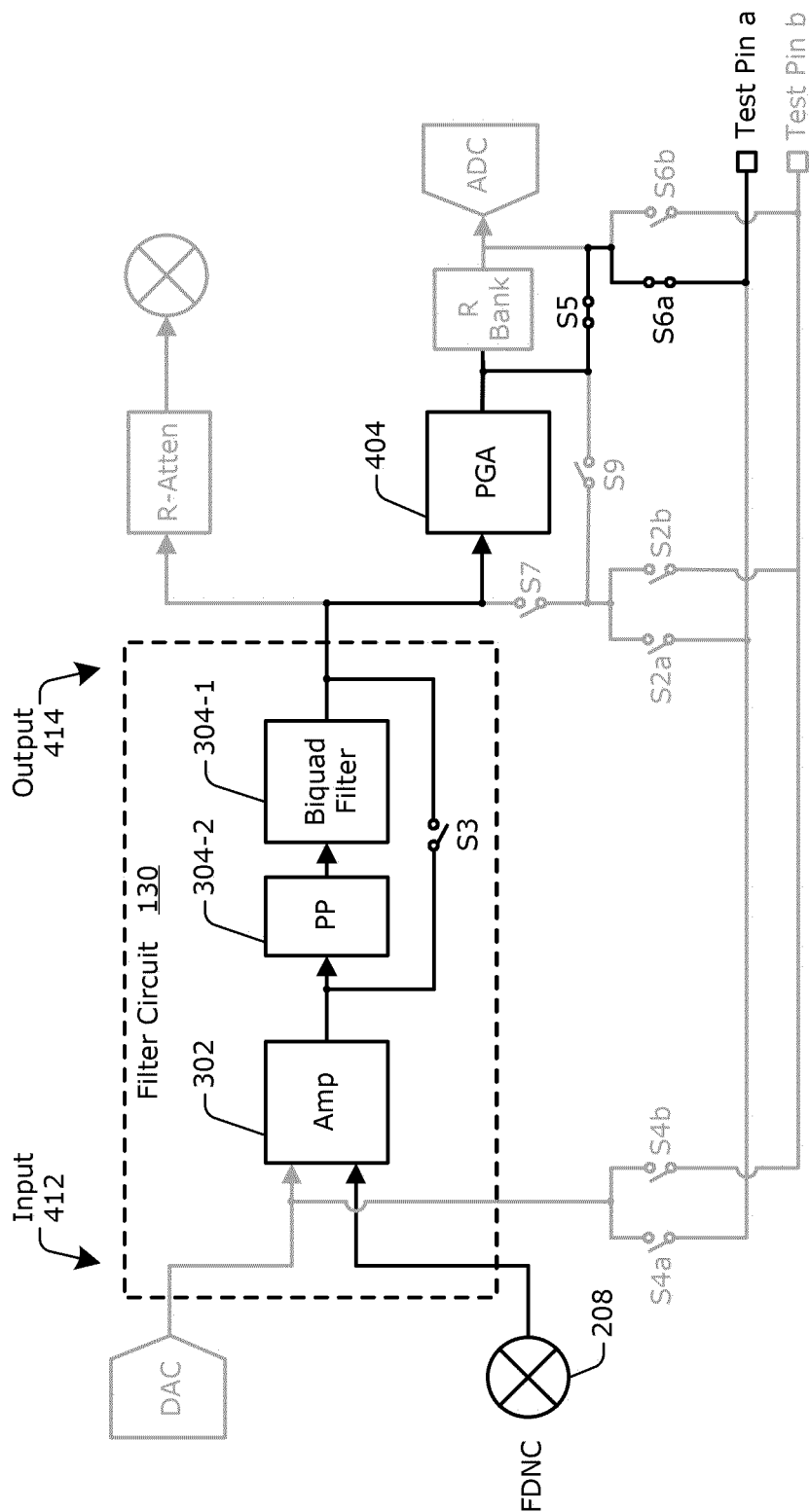
Figures 4, 7:
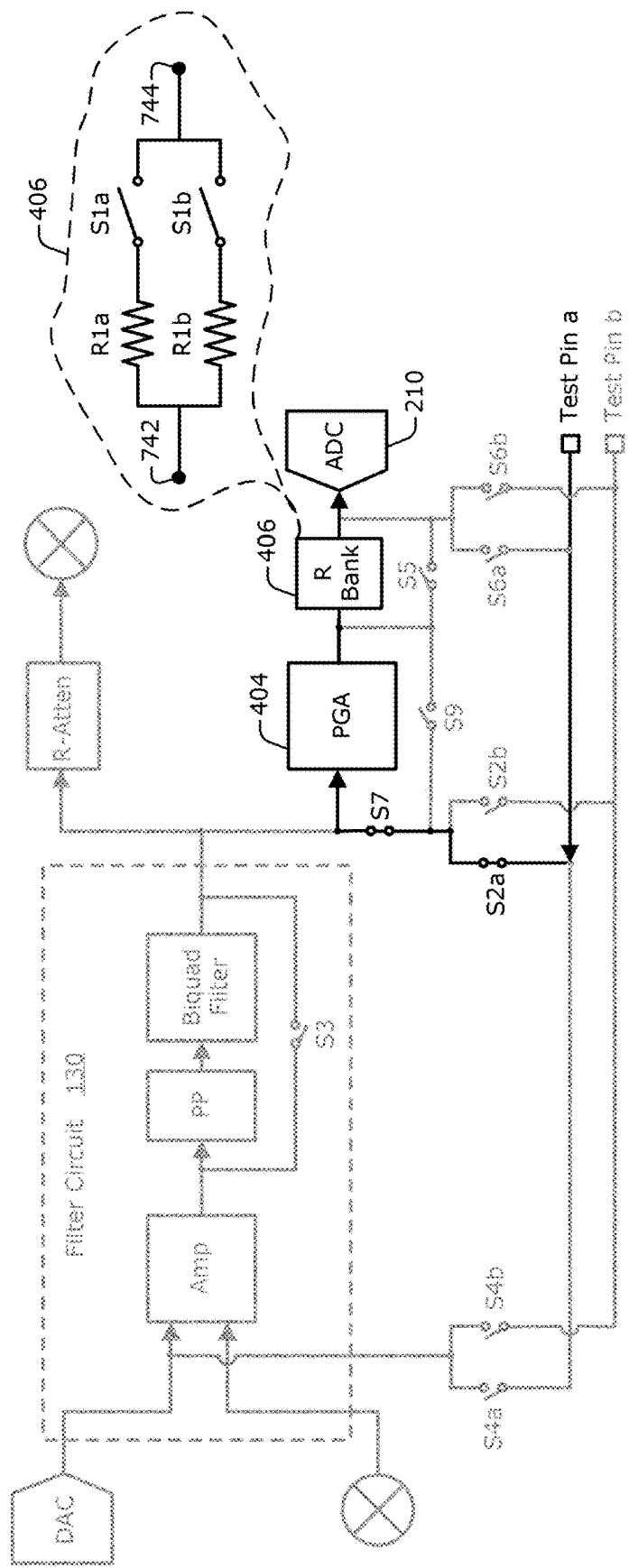

In aspects, a resistor bank 406 may be coupled between the programmable gain amplifier 404 and the analog to-digital converter 210. The resistor bank 406 can be formed in different manners and using different components. For example, the resistor bank 406 can include multiple series connections of at least one resistor and at least one switch, with the multiple series connections coupled together in parallel (e.g., in a parallel array of resistors coupled with respective series switches). An example of a resistor bank 406 is depicted in FIG. 7-4 and described below. The resistor bank 406 can facilitate the coupling of the receive signal 132 from the output of the programmable gain amplifier 404 to the input of the ADC 210. The resistor bank 406 can improve matching between the output impedance of the programmable gain amplifier 404 and the input impedance of the ADC 210. The output impedance of the programmable gain amplifier 404 can have an inductive nature, and the input impedance of the ADC 210 can have a capacitive nature. During high sampling rates, a resonance behavior could otherwise develop between these two opposite impedance natures. Instead, the resistor bank 406 can facilitate the programmable gain amplifier 404 settling faster when the ADC 210 switches from a conversion action to a sampling action. Thus, the resistor bank 406 can provide an adjustable PGA-ADC resonance peak to improve ADC input tracking.

The schematic diagram 400 also includes multiple switches (S #, S #a, or S #b, such as S4a and S7) that can be used to operate the filter circuit 130 or other components of FIG. 4 in different modes or to perform different functions. Examples of these modes or functions are described below with reference to FIGS. 5 to 7-4.

Figure 5:
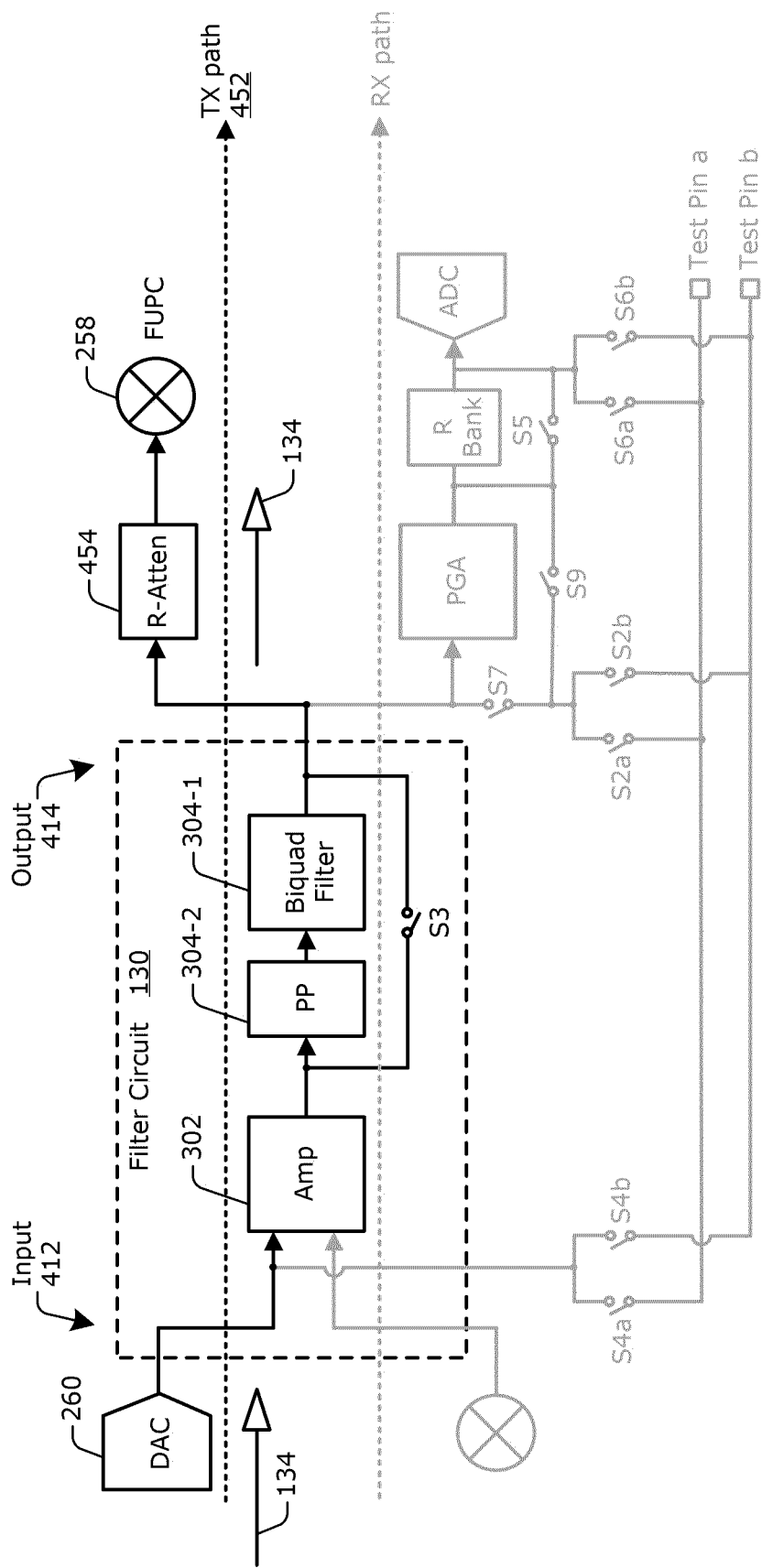
FIG. 5 is a schematic diagram of the example communication components of FIG. 4 illustrating an example configuration for a transmit mode.

FIG. 5 is a schematic diagram 500 of the example communication components of FIG. 4 illustrating an example configuration for a transmit mode. In the example transmit mode, the transmit signal 134 propagates along the TX path 452. More specifically, the transmit signal 134 can propagate through the DAC 260 and the amplifier 302. From the amplifier 302, the transmit signal 134 can propagate through the passive pole 304-2 and the biquad filter 304-1. After "exiting" the filter circuit 130 at the output 414, the transmit signal 134 can propagate from the biquad filter 304-1 to the resistive attenuator 454, through the resistive attenuator 454, and through the frequency upconverter 258.

Figures 1, 6:
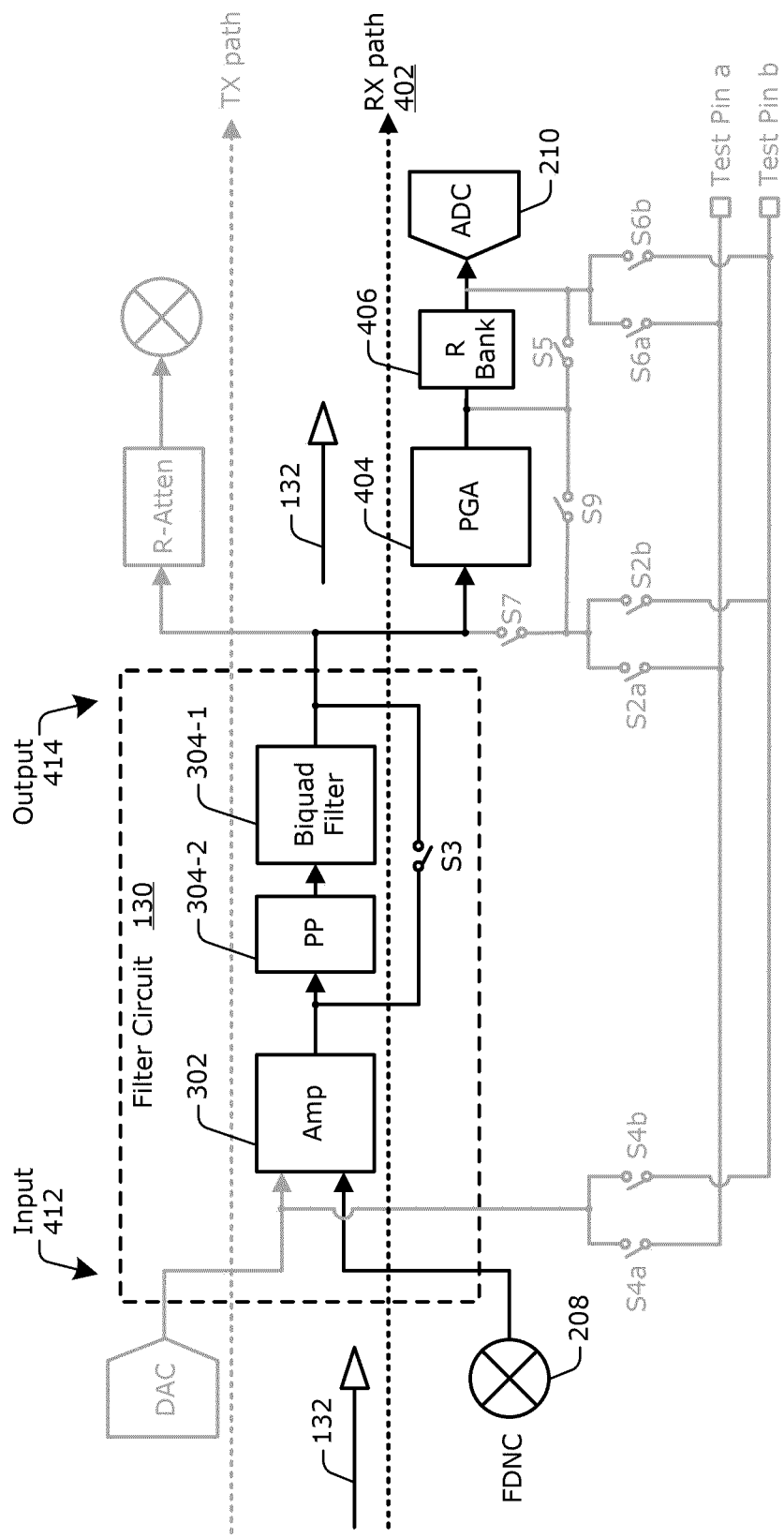
Figures 2, 6:
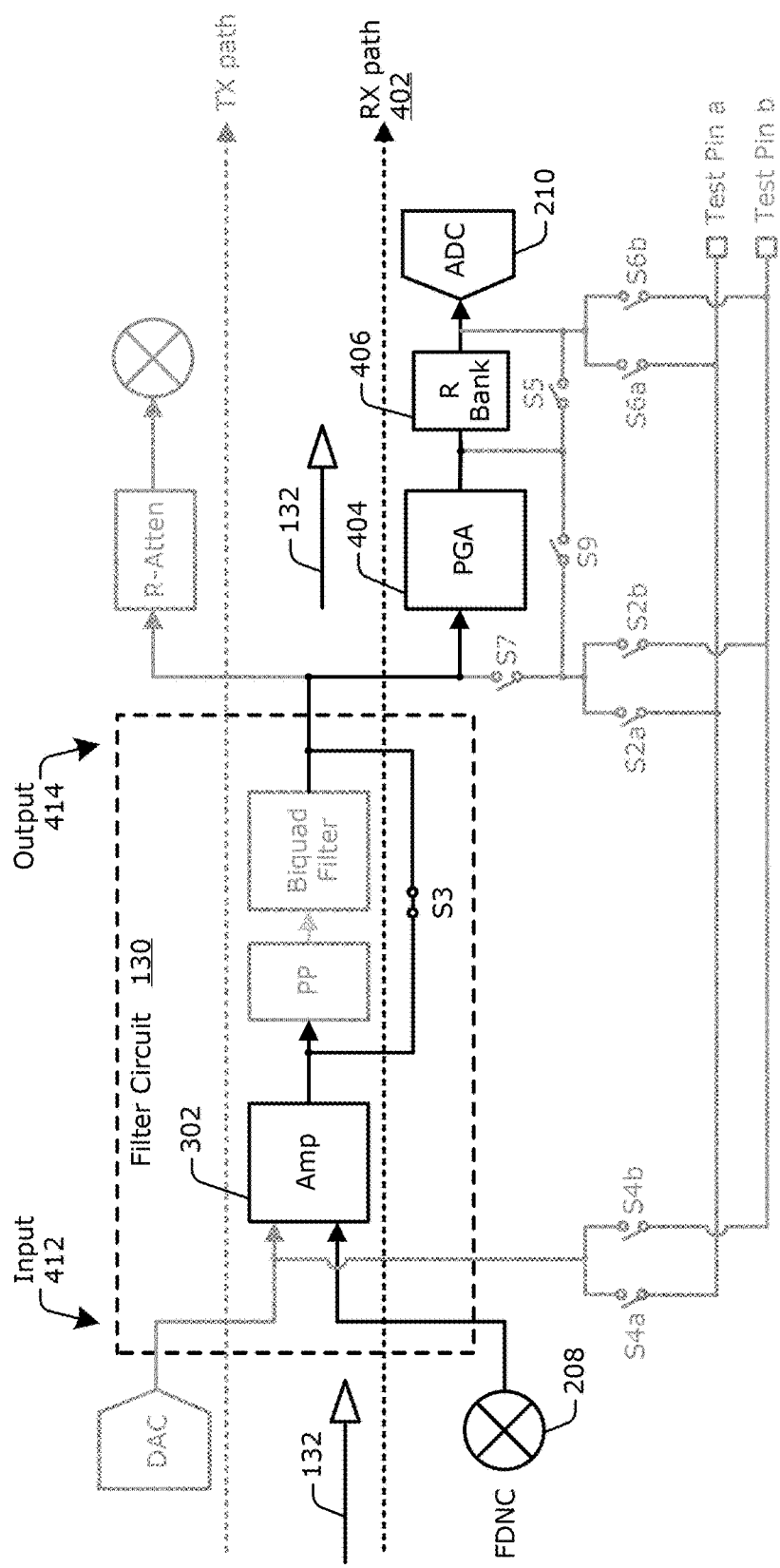

FIGS. 6-1 and 6-2 are schematic diagrams 600-1 and 600-2, respectively, of the example communication components of FIG. 4 illustrating example configurations for two receive modes. In an example receive mode (e.g., a non-DPD RX mode) as shown in FIG. 6-1, the receive signal 132 propagates along the RX path 402. More specifically, the receive signal 132 can propagate through the frequency downconverter 208, to the input 412 of the filter circuit 130, and to and through the amplifier 302. From the amplifier 302, the receive signal 132 can propagate through the passive pole 304-2 and the biquad filter 304-1. After "exiting" the filter circuit 130 at the output 414, the receive signal 132 can propagate from the biquad filter 304-1 to the programmable gain amplifier 404. The receive signal 132 can continue through the programmable gain amplifier 404, through the resistor bank 406, and to and through the ADC 210.

In each of the transmit mode of FIG. 5 and the receive mode of FIG. 6-1, each of the illustrated switches is in an open state. For the DPD-receive mode of FIG. 6-2, however, the switch S3 is in a closed state to provide a shorted path to bypass the biquad filter 304-1, and the passive pole 304-2 if present. Bypassing the biquad filter 304-1 (and the passive pole 304-2) can enable the filter circuit 130 to operate at a higher bandwidth for the receive DPD mode. Accordingly, for a receive DPD mode, the receive signal 132 can propagate through the frequency downconverter 208 and to and through the amplifier 302. From the amplifier 302, the receive signal 132 passes through the switch S3 to bypass the passive pole 304-2 and the biquad filter 304-1. After "exiting" the filter circuit 130 at the output 414, the receive signal 132 can propagate from the amplifier 302 to the programmable gain amplifier 404. The receive signal 132 can continue through the programmable gain amplifier 404, through the resistor bank 406, and to and through the ADC 210.

In example aspects, the switch S3 can be coupled across at least an input of the biquad filter 304-1 and an output of the biquad filter 304-1. Further, the filter circuit 130 can include a passive pole 304-2 coupled between the amplifier 302 and the output 414 of the filter circuit 130. The biquad filter 304-1 and the passive pole 304-2 can be coupled together in series (in any order) to form a series connection. In some of such cases, the switch S3 may be coupled across the series connection of the biquad filter 304-1 and the passive pole 304-2.

To support digital predistortion (DPD) for another transmit chain (not shown), the receive chain (e.g., of FIGS. 2 and 3) of the illustrated RX path 402 can be used as a feedback path for the DPD procedure. The RX path 402 can obtain an indication of a signal being transmitted on the other transmit chain, for instance via a directional coupler. That signal indication is then routed to the frequency downconverter 208 for propagation through the RX path 402 as the depicted receive signal 132.

FIGS. 7-1 to 7-4 are schematic diagrams 700-1 to 700-4, respectively, of the example communication components of FIG. 4 illustrating example configurations for four test modes. The schematic diagrams 700-1 and 700-2 represent example standalone test modes for the filter circuit 130. FIG. 7-1 corresponds to an automated testing mode in which external automated testing equipment (ATE) at least receives the output produced by the filter circuit 130 via a test pin "a" as part of an analog test of the filter circuit 130. The ATE can also provide an input test pattern to the DAC 260. FIG. 7-2 corresponds to a built-in self-test (BIST) mode in which internal circuitry analyzes the output produced by the filter circuit 130 via the digital output of the ADC 210. The BIST circuitry also provides an input test pattern to the DAC 260.

In example implementations, as shown at the schematic diagram 700-1, switches S5 and S6a can be closed, with the other depicted switches being in an open state. A test signal (not explicitly indicated) enters the communication components via the DAC 260. The test signal, as a current output by the DAC 260, propagates through the amplifier 302, the passive pole 304-2, and the biquad filter 304-1. The test signal continues through the programmable gain amplifier 404, the switch S5, and the switch S6a to reach the test pin "a," where the ATE can obtain the results of the test as an analog test mode. Thus, the output voltage of the programmable gain amplifier 404 can be routed to an off-chip path for observation.

In example implementations, as shown at the schematic diagram 700-2 of FIG. 7-2, the depicted switches are each in an open state for a digital-in/digital-out test mode performed by BIST circuitry (not shown) of the wireless interface device. The BIST circuitry introduces a test signal (not explicitly indicated) to the communication components via the DAC 260. The test signal, as a current output by the DAC 260, propagates through the amplifier 302, the passive pole 304-2, and the biquad filter 304-1. The test signal continues through the programmable gain amplifier 404, the resistor bank 406, and the ADC 210. The BIST circuitry can receive the results of the test of the filter circuit 130 for analysis in digital form as output by the ADC 210.

In example implementations, for the schematic diagram 700-3 of FIG. 7-3, the depicted communication components are configured to have an ATE perform a test of the filter circuit 130 for receive-signal processing. For this externally-guided, automated receive-path test mode, switches S5 and S6a can be in a closed state, and the other depicted switches can be open. A test signal (not explicitly indicated) enters the communication components via the frequency downconverter 208. The test signal, as a current output by the frequency downconverter 208, propagates through the amplifier 302, the passive pole 304-2, and the biquad filter 304-1. The test signal continues through the programmable gain amplifier 404, the switch S5, and the switch S6a to reach the test pin "a," where the ATE can obtain the results of the test in an analog test mode. Thus, the PGA output path can be programmed to drive an off-chip load instead of the ADC; this enables the RX path 402, excluding the ADC, to be tested.

In example implementations, for the schematic diagram 700-4 of FIG. 7-4, the depicted communication components are configured to have an ATE perform a test of the ADC 210 of the receive chain. For this externally-guided, automated ADC test mode, switches S7 and S2a can be in a closed state, and the other depicted switches can be in an open state. This ADC test mode enables the ADC 210 to be tested using the programmable gain amplifier 404. The ATE injects a test signal (not explicitly indicated) into the communication components via the test pin "a." The test signal propagates through the switch S2a and the switch S7 to reach the programmable gain amplifier 404. The test signal continues through the programmable gain amplifier 404, the resistor bank 406, and the ADC 210.

The output of the ADC 210, as the results of the test, can be returned to the ATE for analysis or can be forwarded to BIST circuitry of the wireless interface device for analysis. If the sampling clock frequency of the ADC 210 is high, it can be challenging to obtain an acceptable signal-to-noise ratio (SNR) if the test signal is directly injected into the input of the ADC 210. To address this issue, with this ADC test mode, the test signal is instead injected into the input of the programmable gain amplifier 404. The output of the programmable gain amplifier 404 then drives the input of the ADC 210. Thus, the programmable gain amplifier 404 can accept an input voltage from external testing equipment to enable the ADC to be tested with a high sampling rate. In this ADC test mode, the output of the biquad filter 304-1 can be configured to have a high impedance.

An example implementation of the resistor bank 406 is shown in FIG. 7-4. As illustrated, a resistor bank can include multiple resistors R1 and multiple switches S1. A first resistor R1a and a first switch S1a are coupled together in a first series connection. A second resistor R1b and a second switch S1b are coupled together in a second series connection. The first series connection and the second series connection are coupled together in parallel between nodes 742 and 744 (e.g., between the output of the PGA 404 and the input of the ADC 210). With the switch S1a closed and the switch S1b open, the resistance of the resistor bank 406 is "R1a." With the switch S1b closed and the switch S1a open, the resistance of the resistor bank 406 is "R1b." With the switch S1a closed and the switch S1b closed, the resistance of the resistor bank 406 is "(R1a*R1b)/(R1a+R1b)." The resistor bank 406, however, can be formed in different manners or using different components. For example, each resistor may be coupled in parallel with a switch, and each of these parallel connections can be coupled together in series such that closing a switch "removes" a resistor's resistance from the total resistance of the bank. Further, more than two resistors may be included in a resistor bank 406, such as with three or more series connections of a resistor and a switch.

FIGS. 8-1, 8-2, and 8-3 are circuit diagrams 800-1, 800-2, and 800-3 of example implementations of the amplifier 302 of the filter circuit 130 of FIGS. 3 and 4. Each of the circuit diagrams illustrates an example differential implementation of the amplifier 302. Although not explicitly depicted in the drawings, any of the other communication components of FIGS. 3 and 4 may likewise be implemented with differential circuitry to process and propagate differential transmit and receive signals. The principles and depicted circuit components of FIGS. 8-1 to 8-3, however, are also applicable to single-ended implementations.

Figures 1, 8:
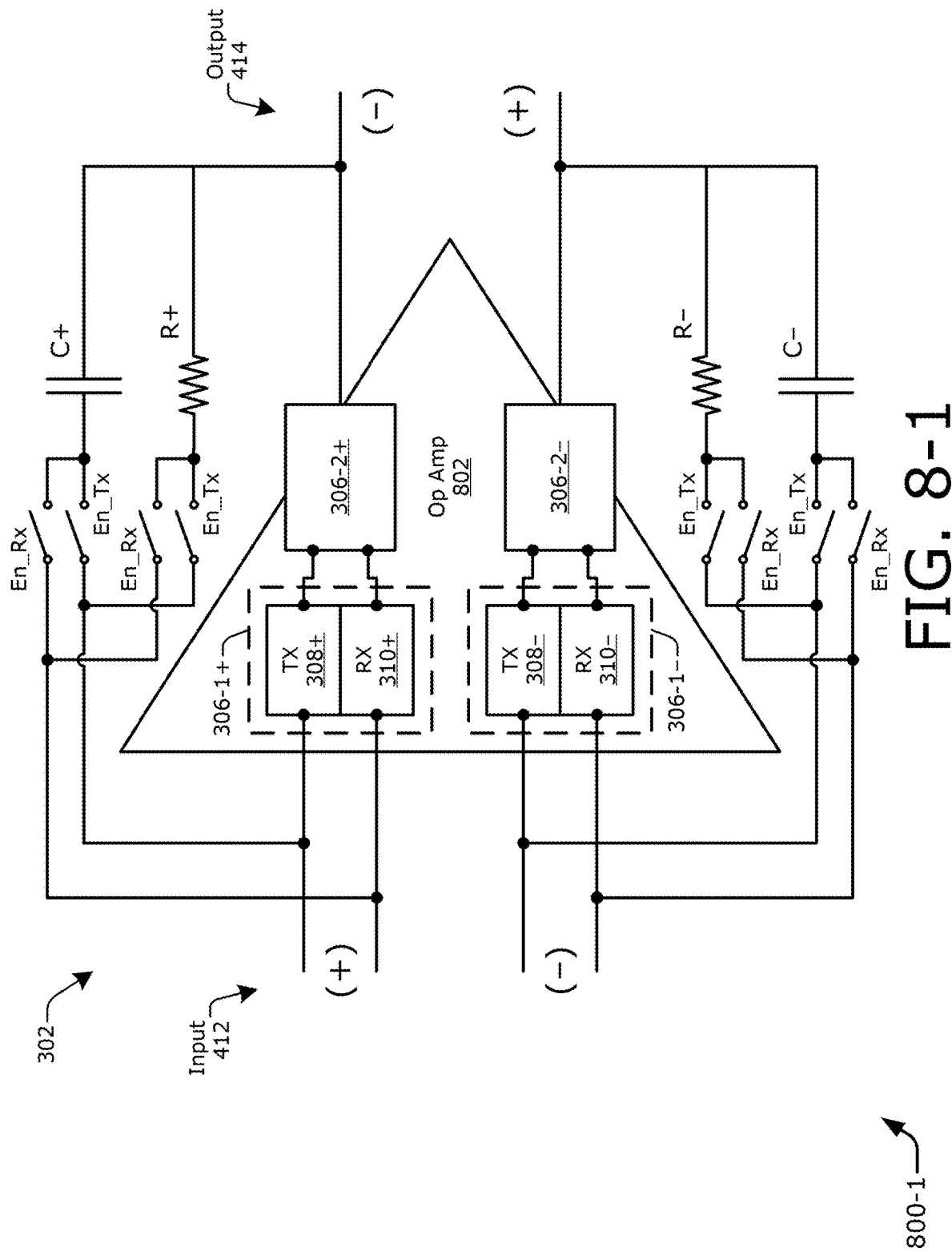
Figures 2, 8:
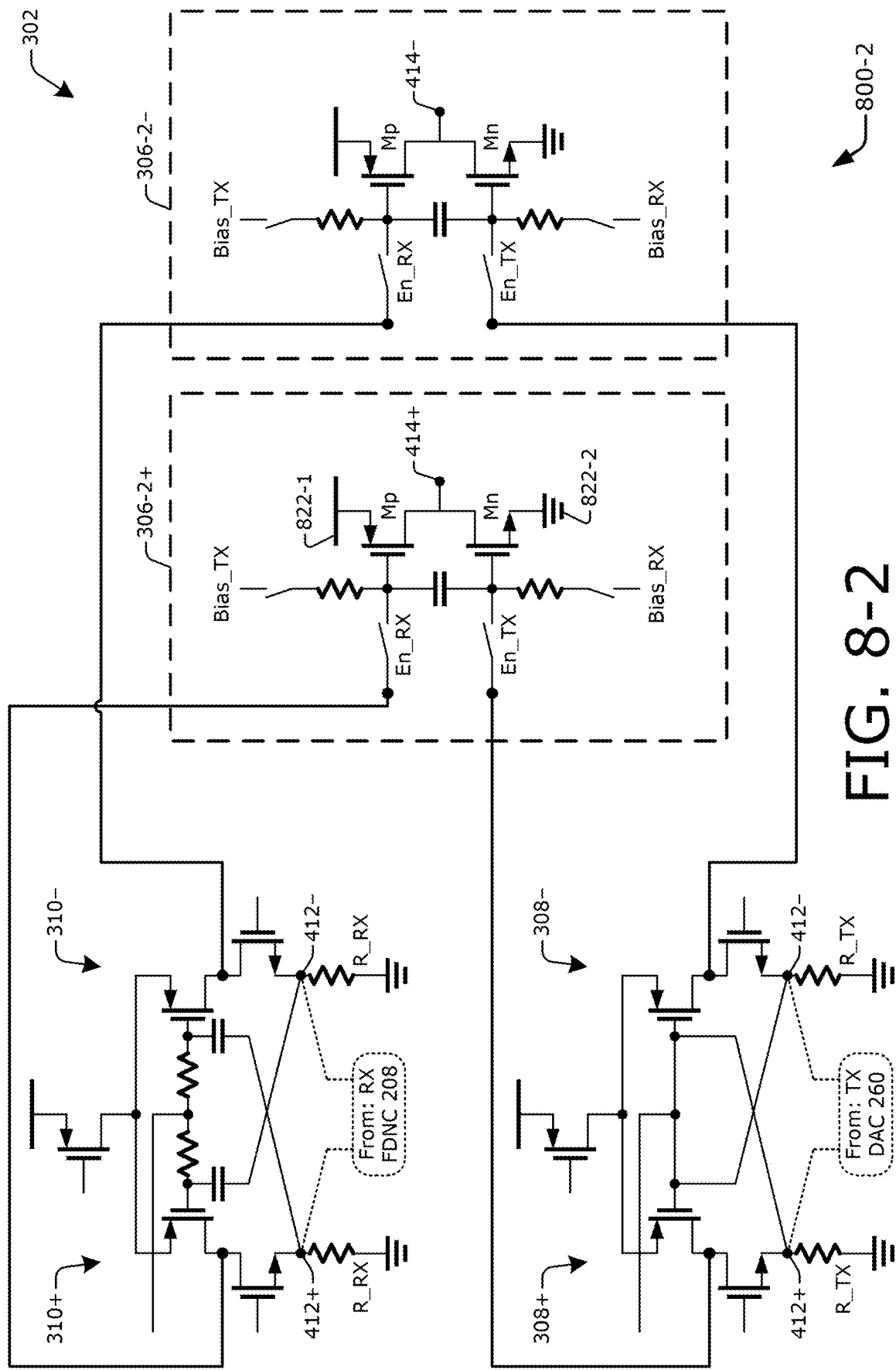
Figures 3, 8:
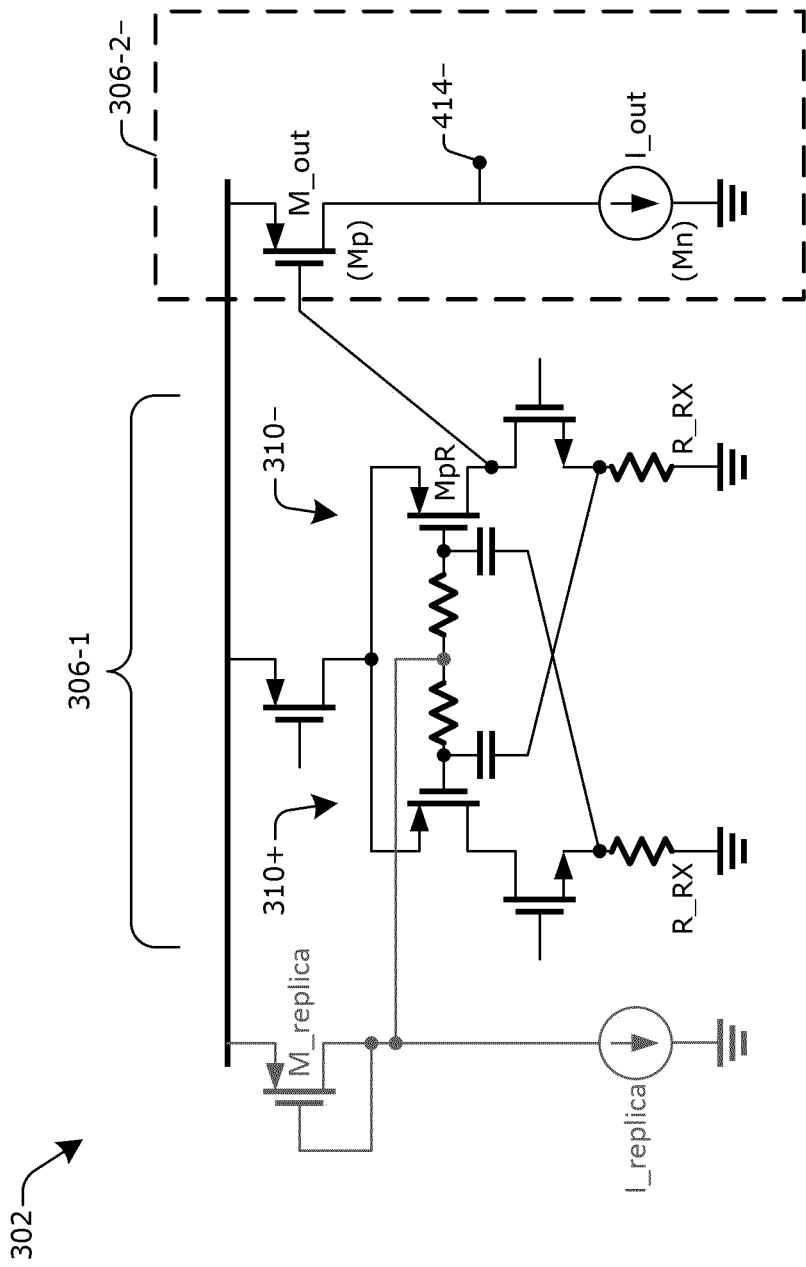

For the circuit diagram 800-1 of FIG. 8-1, the amplifier 302 is depicted at a relatively higher level as compared to FIGS. 8-2 and 8-3. In example implementations, the amplifier 302 includes at least one op amp 802, at least one resistor R, and at least one capacitor C. As illustrated, the amplifier 302 includes a plus capacitor C+, a plus resistor R+, a minus resistor R−, and minus capacitor C− to provide the two RC feedback impedances for the two differential signal parts. The amplifier 302 includes plus and minus parts of the input 412 and plus and minus parts of the output 414.

The amplifier 302 also includes multiple enable switches: En_Tx and En_Rx. For a transmit mode, the En_Tx switches are closed to couple the capacitors and resistors to the transmit portion 308 of the first stage 306-1. For the receive mode, the En_Rx switches are closed to couple the capacitors and resistors to the receive portion 310 of the first stage 306-1. More specifically, the capacitors and resistors can be coupled to plus and minus parts of the transmit portion 308 and the receive portion 310, as is shown in FIG. 8-1 and described next.

In some differential aspects, the first stage 306-1 includes a plus first stage 306-1+ and a minus first stage 306-1−. The plus first stage 306-1+ includes a plus transmit portion 308+ and a plus receive portion 310+. The minus first stage 306-1− includes a minus transmit portion 308− and a minus receive portion 310−. The second stage 306-2 includes a plus second stage 306-2+ and a minus second stage 306-2−. The plus first stage 306-1+ and the plus second stage 306-2+ are coupled together in series between the plus input 412(+) and the plus output 414(+). Similarly, the minus first stage 306-1− and the minus second stage 306-2− are coupled together in series between the minus input 412(−) and the minus output 414(−). The illustrated components may be further coupled together as depicted in FIGS. 8-1, 8-2, and 8-3.

For the circuit diagram 800-2 of FIG. 8-2, the amplifier 302 is depicted at a relatively lower level as compared to the circuit diagram 800-1. In example implementations, particular arrangements of transistors are illustrated for the plus transmit portion 308+ and the minus transmit portion 308−, for the plus receive portion 310+ and the minus receive portion 310−, and for the plus second stage 306-2+ and the minus second stage 306-2−. The operation of the first stage 306-1 can be divided between processing transmit signals and receive signals. The transmit portion 308 of the first stage 306-1 processes transmit signals, and the receive portion 310 of the first stage 306-1 processes receive signals. In contrast, the second stage 306-2 can jointly process transmit signals and receive signals.

In example operations for a receive signal, the frequency downconverter 208 provides the receive signal to the receive portion 310 at the plus and minus inputs 412+ and 412−. In the receive mode, the En_RX and Bias_RX switches are closed. Accordingly, the receive signal is routed to the gate terminals of the p-channel field effect transistors (PFETs) Mp of the second stage 306-2. The n-channel FETs (NFETs)

Mn can be biased to operate as current sources. The plus and minus receive signal parts are output at the plus and minus output nodes 414+ and 414−.

In example operations for a transmit signal, the DAC 260 provides the transmit signal to the transmit portion 308 at the plus and minus input nodes 412+ and 412−. In the transmit mode, the En_TX and Bias_TX switches are closed. Accordingly, the transmit signal is routed to the gate terminals of the NFETs Mn of the second stage 306-2. The PFETs Mp can be biased to operate as current sources. The plus and minus transmit signal parts are output at the plus and minus output nodes 414+ and 414−.

Thus, the amplifier 302 supports dual current input paths in the first stage 306-1 to comply with different signaling specification(s) driven by the performance of the transmit chain DAC 260 and the receive chain frequency downconverter 208. For example, a different signaling specification can relate to different input common-mode voltage parameters. In some cases, the input common-mode voltage to couple to the DAC 260 can be less than the input common-mode voltage to couple to the frequency downconverter 208 (e.g., the common-mode voltage of the receive portion 310 may be 1.5 to 3 times greater than that of the transmit portion 308).

Regarding the output path in the second stage 306-2, this output path can be reused, or shared, between the TX and RX modes. As shown in FIG. 8-2, the relatively higher input common-mode voltage of the receive portion 310 of the input stage drives the PFET Mp of the output stage. For the relatively lower input common-mode voltage of the transmit portion 308 of the input stage, the transmit portion of the input stage drives the NFET Mn of the output stage.

Generally, each transistor that is described herein or depicted in the associated and incorporated drawings may be realized with any one or more of multiple transistor types. Examples transistor types include a field effect transistor (FET), a junction FET (JFET), a metal-oxide-semiconductor FET (MOSFET), a bipolar junction transistor (BJT), an insulated-gate bipolar transistor (IGBT), and so forth. Manufacturers may fabricate FETs as n-channel or p-channel transistor types and may fabricate BJTs as NPN or PNP transistor types.

Each transistor may include at least one control terminal and one or more channel terminals. With an FET transistor, for instance, a control terminal can correspond to a gate terminal, and a channel terminal can correspond to a source terminal or a drain terminal. With a BJT transistor, for instance, a control terminal can correspond to a base terminal, and a channel terminal can correspond to an emitter terminal or a collector terminal.

In example aspects, with reference to the second stage 306-2, a receive transistor Mp can include a control terminal and a channel terminal. The control terminal of the receive transistor Mp can be coupled to the receive portion 310 of the first stage 306-1 (as explicitly indicated in FIGS. 3 and 8-1) of the amplifier 302 (e.g., a transimpedance amplifier). A transmit transistor Mn can include a control terminal and a channel terminal. The control terminal of the transmit transistor Mn can be coupled to the transmit portion 308 of the first stage 306-1 of the amplifier 302. Further, the channel terminal of the transmit transistor Mn can be coupled to the channel terminal of the receive transistor Mp. In some cases, the receive transistor Mp and the transmit transistor Mn can be coupled together in series via the channel terminal of the transmit transistor Mn and the channel terminal of the receive transistor Mp to form a series connection. The series connection can be coupled between a first power distribution node 822-1 and a second power distribution node 822-2. Examples of power distribution nodes include a ground node and a supply voltage node (or rail).

For the circuit diagram 800-3 of FIG. 8-3, a portion of an amplifier 302 that pertains to a receive mode is depicted at a relatively lower level. In example implementations, replica components are included as part of the amplifier 302 to accommodate, e.g., process corners and changes in temperature. The receive portion 310 (e.g., the minus receive portion 310−) of the first stage 306-1 of the amplifier 302 can include a receive-portion transistor MpR. The minus second stage 306-2− of the amplifier 302 can include a transistor M_out (e.g., corresponding to the transistor Mp of FIG. 8-2) that is configured to propagate a current I_out produced by a current source (e.g., realized using the transistor Mn of FIG. 8-2) based on operating in a receive mode.

The amplifier 302 can further include a replica transistor M_replica that is replicated relative to the transistor M_out (or Mp in FIG. 8-2) of the minus second stage 306-2−. Here, the replica transistor M_replica is configured to propagate a replica current I_replica that is replicated relative to the current I_out based on being in the receive mode. A channel terminal (e.g., a drain terminal) of the replica transistor M_replica is coupled (e.g., via at least one resistor) to a control terminal (e.g., a gate terminal) of the receive-portion transistor MpR. A channel terminal (e.g., a drain terminal) of the receive-portion transistor MpR is coupled to a control terminal (e.g., a gate terminal) of the transistor M_out of the minus second stage 306-2−. Although the plus second stage 306-2+ is omitted from FIG. 8-3, an analogous replica transistor and replica current may be implemented for the plus signaling components. In some cases, a replica component can be realized as a scaled version of another component, such as a smaller scaled version to occupy a smaller area or to use less power.

In example operations, with the input stage DC-coupled to the output stage (e.g., with the drain terminal of the receive-portion transistor MpR DC-coupled to the gate terminal of the output transistor M_out), the output common-mode voltage of the input stage can be set by the transistor M_out and the current source producing the current I_out. These parameters can vary over process corner and temperature. As shown in the circuit diagram 800-3, the PFET gate biasing (of the receive-portion transistor MpR) of the input stage can be set by the transistor M_replica, which is a replica device of the transistor M_out, and by the current I_replica, which is a replica current of the output current I_out. Here, the replication of a current can correspond to having a current density or a current type, including having both, that are substantially the same. This allows the input stage PFET to be in the saturation region over process-voltage-temperature (PVT) variation to maintain a high loop gain.

Figure 9:
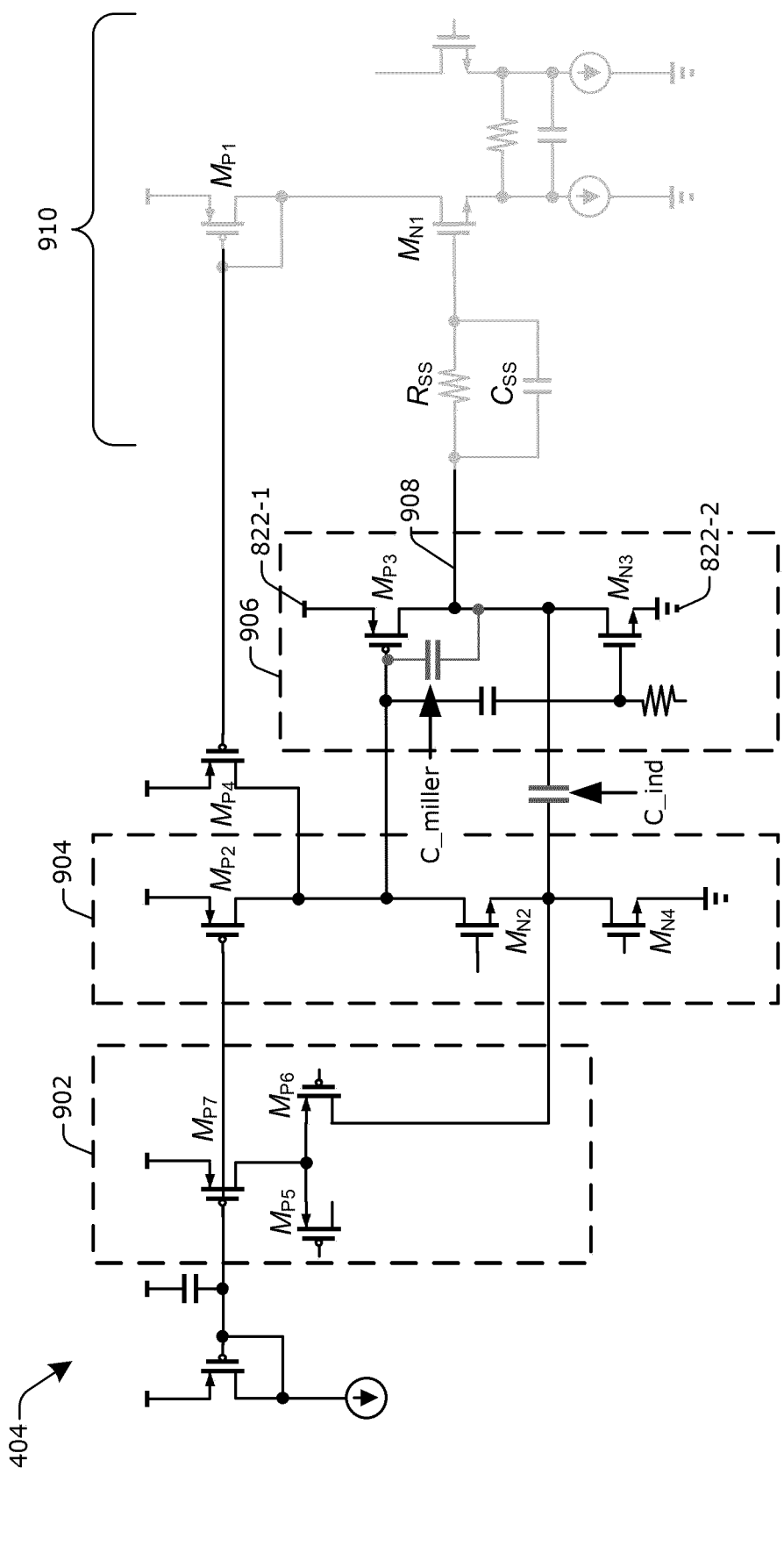
FIG. 9 is a circuit diagram of an example implementation of a programmable gain amplifier that can be incorporated into the communication components of FIG. 4.

FIG. 9 is a circuit diagram 900 of an example implementation of a programmable gain amplifier 404 that can be incorporated into the communication components of FIG. 4. In example implementations, the programmable gain amplifier 404 includes multiple stages: an input stage 902, an intermediate stage 904, and an output stage 906. The programmable gain amplifier 404 can also include circuitry for common-mode feedback signaling at 910. The input stage 902 can include two input transistors M_P5 and M_P6. The intermediate stage 904 can operate as a cascode stage with at least two transistors M_N2 and M_N4. The output stage 906 can include two transistors M_P3 and M_N3. Between the transistors M_P3 and M_N3, an output node 908 is present to drive the ADC 210 or drive the resistor bank 406 prior to the ADC 210.

A non-dominant zero of the programmable gain amplifier 404 can elevate the alternating current (AC) gain (or can reduce the AC attenuation) at high frequencies (e.g., approximately 1-2 GHZ). Thermal noise at around this frequency range may be folded back to in-band frequencies after the sample-and-hold of the ADC 210, which degrades the SNR. To compensate at least partially for this SNR degradation, at least one capacitor can be incorporated into the circuitry of the programmable gain amplifier 404.

Example compensation capacitors to stabilize the PGA feedback loop include: a C_miller capacitor, which may correspond to "Miller" compensation, and a C_ind capacitor, which may provide "indirect" compensation. The C_ind capacitor enables the open loop bandwidth to be increased. Employing the C_ind capacitor, however, can create a high-frequency zero, which creates a frequency hump in the frequency response that can impact the ADC sampling as described above. Incorporating the C_miller capacitor can lower the frequency hump. Thus, one compensation capacitor may be employed, or two compensation capacitors may be employed. Using two compensation capacitors provides for two degrees of freedom to reduce the frequency hump (for better SNR) while maintaining high loop gain (for better linearity).

In example aspects, the programmable gain amplifier 404 can include an input stage 902, an output stage 906, and an intermediate stage 904 coupled between the input stage 902 and the output stage 906. The programmable gain amplifier 404 can also include a first compensation capacitor (e.g., the C_ind capacitor) coupled between the intermediate stage 904 and the output stage 906. As shown in FIG. 9, the compensation C_ind capacitor can be coupled in between and in series with the intermediate stage 904 and the output stage 906.

In some aspects, the output stage 906 includes a first transistor (e.g., the transistor M_P3) and a second transistor (e.g., the transistor M_N3) coupled together in series between a first power distribution node (e.g., the power distribution node 822-1, which is a supply voltage node or rail in FIG. 9) and a second power distribution node (e.g., the power distribution node 822-2, which is a ground node in FIG. 9). The programmable gain amplifier 404 also includes a second compensation capacitor (e.g., the C_miller capacitor) coupled between a control terminal of the first transistor (e.g., a gate terminal of the transistor M_P3) and a channel terminal of the first transistor (e.g., a drain terminal of the transistor M_P3).

Figure 10:
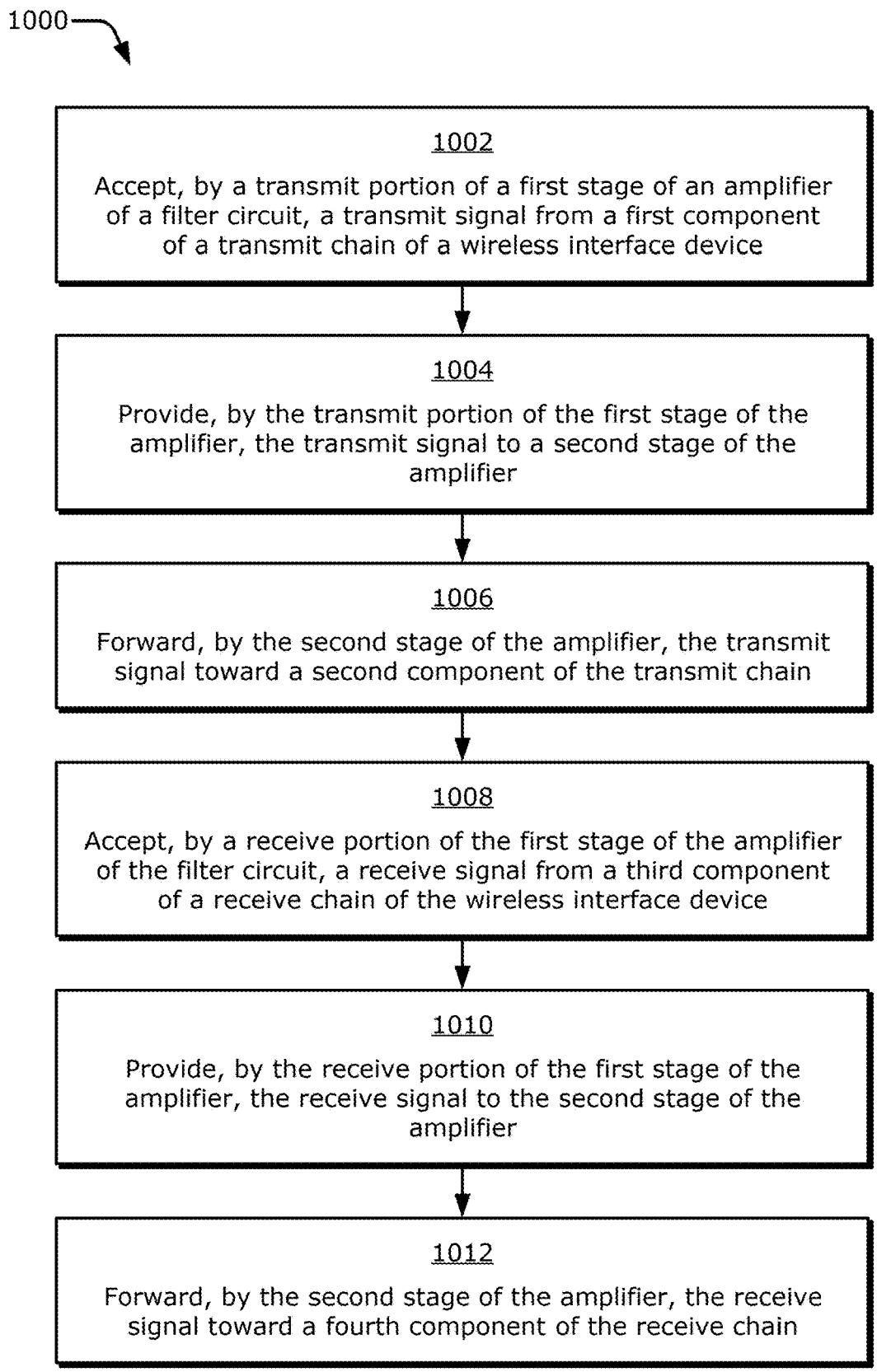
FIG. 10 is a flow diagram illustrating an example process for shared filtering or operating a shared filter circuit.

FIG. 10 is a flow diagram illustrating an example process 1000 for shared filtering or operating a shared filter circuit. The process 1000 includes six blocks 1002-1012 that specify operations that can be performed for a method. The process is described in the form of a set of blocks that specify operations that can be performed. However, operations are not necessarily limited to the order shown in the figures or described herein, for the operations may be implemented in alternative orders or in fully or partially overlapping manners. Also, more, fewer, and/or different operations may be implemented to perform a respective process or an alternative process.

At block 1002, a transmit signal is accepted, by a transmit portion of a first stage of an amplifier of a filter circuit, from a first component of a transmit chain of a wireless interface device. For example, a transmit portion 308 of a first stage 306-1 of an amplifier 302 of a filter circuit 130 can accept a transmit signal 134 from a first component 312-1 of a transmit chain 252 of a wireless interface device 120. For instance, the transmit portion 308 of the first stage 306-1 of the amplifier 302 may accept a transmit signal 134 from a DAC 260.

At block 1004, the transmit signal is provided, by the transmit portion of the first stage of the amplifier, to a second stage of the amplifier. For example, the transmit portion 308 of the first stage 306-1 of the amplifier 302 can provide the transmit signal 134 to a second stage 306-2 of the amplifier 302. In some cases, the providing of the transmit signal 134 may be effected through a DC-coupling between at least two transistors, such as a transistor of the transmit portion 308 and a transmit output transistor Mn of the second stage 306-2.

At block 1006, the transmit signal is forwarded, by the second stage of the amplifier, toward a second component of the transmit chain. For example, the second stage 306-2 of the amplifier 302 can forward the transmit signal 134 toward a second component 312-2 of the transmit chain 252. For instance, the second stage 306-2 of the amplifier 302 may forward the transmit signal 134 toward a frequency upconverter 258. One or more other components, such as a biquad filter 304-1 or a resistive attenuator 454, may process the transmit signal 134 before the signal "reaches" the frequency upconverter 258.

At block 1008, a receive signal is accepted, by a receive portion of the first stage of the amplifier of the filter circuit, from a third component of a receive chain of the wireless interface device. For example, a receive portion 310 of the first stage 306-1 of the amplifier 302 of the filter circuit 130 can accept a receive signal 132 from a third component 312-3 of a receive chain 202 of the wireless interface device 120. Here, the receive portion 310 of the first stage 306-1 of the amplifier 302 may accept a receive signal 132 from a frequency downconverter 208 of the receive chain 202.

At block 1010, the receive signal is provided, by the receive portion of the first stage of the amplifier, to the second stage of the amplifier. For example, the receive portion 310 of the first stage 306-1 of the amplifier 302 can provide the receive signal 132 to the second stage 306-2 of the amplifier 302. Thus, a receive-specific stage of the circuitry of the amplifier 302 may provide the receive signal 132 to a joint, or shared, receive-transmit stage of the amplifier 302.

At block 1012, the receive signal is forwarded, by the second stage of the amplifier, toward a fourth component of the receive chain. For example, the second stage 306-2 of the amplifier 302 can forward the receive signal 132 toward a fourth component 312-4 of the receive chain 202. To do so, the second stage 306-2 of the amplifier 302 may forward the receive signal 132 to a programmable gain amplifier 404, a resistor bank 406, or an ADC 210.

IMPLEMENTATION EXAMPLES

This section describes some aspects of example implementations and/or example configurations related to the apparatuses and/or processes presented above.

Example aspect 1: An apparatus comprising:
  a wireless interface device comprising:
    a transmit chain comprising a first component and a second component;
    a receive chain comprising a third component and a fourth component; and
    a filter circuit comprising an amplifier, the amplifier comprising a first stage and a second stage, the first stage comprising a transmit portion coupled to the second stage and a receive portion coupled to the second stage, the transmit portion and the second stage coupled together in series between the first component and the second component of the transmit chain, and the receive portion and the second stage coupled together in series between the third component and the fourth component of the receive chain.

Example aspect 2: The apparatus of example aspect 1, wherein:

the transmit portion of the first stage is coupled between the first component of the transmit chain and the second stage of the amplifier;

the first component comprises an upstream transmit component;

the second component comprises a downstream transmit component;

the receive portion of the first stage is coupled between the third component of the receive chain and the second stage of the amplifier;

the third component comprises an upstream receive component; and the fourth component comprises a downstream receive component.

Example aspect 3: The apparatus of example aspect 2, wherein:

the upstream transmit component comprises a digital-to-analog converter;

the downstream transmit component comprises a frequency upconverter;

the upstream receive component comprises a frequency downconverter; and the downstream receive component comprises an analog-to-digital converter.

Example aspect 4: The apparatus of example aspect 2, wherein:

the upstream transmit component comprises at least part of a communication processor;

the downstream transmit component comprises at least one antenna;

the upstream receive component comprises the at least one antenna; and the downstream receive component comprises at least part of the communication processor.

Example aspect 5: The apparatus of any one of the preceding example aspects, wherein:

the wireless interface device is configured to share the filter circuit between the transmit chain and the receive chain using time-division multiplexing (TDM).

Example aspect 6: The apparatus of any one of the preceding example aspects, wherein:

the wireless interface device is configured to share the filter circuit between the transmit chain and the receive chain by:

propagating a transmit signal through the transmit portion of the first stage of the amplifier and through the second stage of the amplifier during a transmit mode; and propagating a receive signal through the receive portion of the first stage of the amplifier and through the second stage of the amplifier during a receive mode.

Example aspect 7: The apparatus of any one of the preceding example aspects, wherein:

the first component comprises a digital-to-analog converter;

the second component comprises a frequency upconverter;

the third component comprises a frequency downconverter; and the fourth component comprises an analog-to-digital converter.

Example aspect 8: The apparatus of example aspect 7, wherein the wireless interface device further comprises:

an attenuator coupled between the amplifier of the filter circuit and the frequency upconverter; and a programmable gain amplifier coupled between the amplifier of the filter circuit and the analog-to-digital converter.

Example aspect 9: The apparatus of example aspect 8, wherein:

the attenuator comprises multiple resistors coupled to one or more switches; and the one or more switches of the attenuator are configured to:

establish, in a transmit mode, an attenuation factor of the attenuator; and isolate, in a receive mode, the attenuator from at least one of the filter circuit or the programmable gain amplifier of the receive chain.

Example aspect 10: The apparatus of example aspect 8 or example aspect 9, wherein:

the programmable gain amplifier comprises at least one switch; and the at least one switch of the programmable gain amplifier is configured to:

establish, in a receive mode, a gain factor of the programmable gain amplifier; and isolate, in a transmit mode, the programmable gain amplifier from at least one of the filter circuit or the attenuator of the transmit chain.

Example aspect 11: The apparatus of any one of example aspects 8 to 10, wherein:

the wireless interface device further comprises a resistor bank coupled between the programmable gain amplifier and the analog-to-digital converter; and the programmable gain amplifier and the resistor bank comprise part of the receive chain.

Example aspect 12: The apparatus of any one of example aspects 8 to 11, wherein the programmable gain amplifier comprises:

an input stage;

an output stage;

an intermediate stage coupled between the input stage and the output stage; and a first compensation capacitor coupled between the intermediate stage and the output stage.

Example aspect 13: The apparatus of example aspect 12, wherein:

the output stage comprises a first transistor and a second transistor coupled together in series between a first power distribution node and a second power distribution node; and the programmable gain amplifier comprises a second compensation capacitor coupled between a control terminal of the first transistor and a channel terminal of the first transistor.

Example aspect 14: The apparatus of any one of the preceding example aspects, wherein the filter circuit is configured to process signals at a baseband frequency.

Example aspect 15: The apparatus of any one of the preceding example aspects, wherein:
the transmit portion of the first stage of the amplifier is configured to process a transmit signal accepted from the first component of the transmit chain; and
the receive portion of the first stage of the amplifier is configured to process a receive signal accepted from the third component of the receive chain.

Example aspect 16: The apparatus of example aspect 15, wherein:
the transmit signal accepted from the first component of the transmit chain is configured to have a first common-mode voltage; and
the receive signal accepted from the third component of the receive chain is configured to have a second common-mode voltage that is different from the first common-mode voltage.

Example aspect 17: The apparatus of example aspect 15 or example aspect 16, wherein the second stage of the amplifier is configured to:
accept the transmit signal from the transmit portion of the first stage of the amplifier and process the accepted transmit signal; and
accept the receive signal from the receive portion of the first stage of the amplifier and process the accepted receive signal.

Example aspect 18: The apparatus of any one of the preceding example aspects, wherein the amplifier comprises a transimpedance amplifier.

Example aspect 19: The apparatus of example aspect 18, wherein:
the receive portion of the first stage of the amplifier comprises a receive-portion transistor;
the second stage of the amplifier comprises a transistor that is configured to propagate a current based on a receive mode;
the transimpedance amplifier comprises a replica transistor relative to the transistor of the second stage, the replica transistor configured to propagate a replica current relative to the current based on the receive mode;
a channel terminal of the replica transistor is coupled to a control terminal of the receive-portion transistor; and
a channel terminal of the receive-portion transistor is coupled to a control terminal of the transistor of the second stage.

Example aspect 20: The apparatus of example aspect 18 or example aspect 19, wherein the second stage comprises:
a receive transistor comprising a control terminal and a channel terminal, the control terminal coupled to the receive portion of the first stage of the transimpedance amplifier; and
a transmit transistor comprising a control terminal and a channel terminal, the control terminal of the transmit transistor coupled to the transmit portion of the first stage of the transimpedance amplifier, the channel terminal of the transmit transistor coupled to the channel terminal of the receive transistor.

Example aspect 21: The apparatus of example aspect 20, wherein:
the receive transistor and the transmit transistor are coupled together in series via the channel terminal of the transmit transistor and the channel terminal of the receive transistor between a first power distribution node and a second power distribution node.

Example aspect 22: The apparatus of any one of the preceding example aspects, wherein the filter circuit comprises:
a biquad filter coupled between the amplifier and the second component of the transmit chain and between the amplifier and the fourth component of the receive chain.

Example aspect 23: The apparatus of example aspect 22, wherein the wireless interface device further comprises:
a switch coupled across at least an input of the biquad filter and an output of the biquad filter.

Example aspect 24: The apparatus of example aspect 23, wherein:
the filter circuit comprises a passive pole coupled between the amplifier and the second component of the transmit chain and between the amplifier and the fourth component of the receive chain;
the biquad filter and the passive pole are coupled together in series to form a series connection; and
the switch is coupled across the series connection of the biquad filter and the passive pole.

Example aspect 25: The apparatus of example aspect 23 or example aspect 24, wherein:
the switch is configured to be in a closed state to bypass the biquad filter based on at least a portion of the receive chain, including the filter circuit, being in a digital predistortion (DPD) mode.

Example aspect 26: An apparatus comprising:
a wireless interface device comprising:
  a transmit chain comprising a first component and a second component;
  a receive chain comprising a third component and a fourth component; and
  a filter circuit comprising an amplifier, the amplifier comprising a first stage and a second stage, the first stage comprising:
    means for accepting a transmit signal from the first component of the transmit chain; and
    means for accepting a receive signal from the third component of the receive chain,
  the means for accepting a transmit signal and the second stage coupled together in series between the first component and the second component of the transmit chain, and
  the means for accepting a receive signal and the second stage coupled together in series between the third component and the fourth component of the receive chain.

Example aspect 27: A method of operating a shared filter circuit, the method comprising:
accepting, by a transmit portion of a first stage of an amplifier of a filter circuit, a transmit signal from a first component of a transmit chain of a wireless interface device;
providing, by the transmit portion of the first stage of the amplifier, the transmit signal to a second stage of the amplifier;
forwarding, by the second stage of the amplifier, the transmit signal toward a second component of the transmit chain;
accepting, by a receive portion of the first stage of the amplifier of the filter circuit, a receive signal from a third component of a receive chain of the wireless interface device;
providing, by the receive portion of the first stage of the amplifier, the receive signal to the second stage of the amplifier; and forwarding, by the second stage of the amplifier, the receive signal toward a fourth component of the receive chain.

Example aspect 28: An apparatus comprising:
a wireless interface device comprising:
   a filter circuit including an input and an output, the filter circuit comprising:
     a transimpedance amplifier coupled to the input of the filter circuit; and
     a biquad filter coupled in series with the transimpedance amplifier between the input and the output of the filter circuit, the biquad filter coupled between the transimpedance amplifier and the output of the filter circuit;
   a resistive attenuator coupled to the output of the filter circuit;
   a programmable gain amplifier coupled to the output of the filter circuit; and
   a resistor bank coupled to the programmable gain amplifier, the programmable gain amplifier coupled between the output of the filter circuit and the resistor bank.

Example aspect 29: The apparatus of example aspect 28, wherein:
   the filter circuit comprises a passive pole coupled between the transimpedance amplifier and the output of the filter circuit; and
   the biquad filter and the passive pole are coupled together in series to form a series connection; and
   the wireless interface device further comprises a switch coupled in parallel with the series connection of the biquad filter and the passive pole.

Example aspect 30: The apparatus of example aspect 28 or example aspect 29, wherein:
   the wireless interface device further comprises:
     a digital-to-analog converter coupled to the input of the filter circuit;
     a frequency upconverter coupled to the resistive attenuator;
     a frequency downconverter coupled to the input of the filter circuit; and
     an analog-to-digital converter coupled to the resistor bank;
   the transimpedance amplifier is coupled between the digital-to-analog converter and the biquad filter;
   the transimpedance amplifier is coupled between the frequency downconverter and the biquad filter;
   the resistive attenuator is coupled between the biquad filter and the frequency upconverter; and
   the resistor bank is coupled between the programmable gain amplifier and the analog-to-digital converter.

CONCLUSION

As used herein, the terms "couple," "coupled," or "coupling" refer to a relationship between two or more components that are in operative communication with each other to implement some feature or realize some capability that is described herein. The coupling can be realized using, for instance, a physical line, such as a metal trace or wire, or an electromagnetic coupling, such as with a transformer. A coupling can include a direct coupling or an indirect coupling. A direct coupling refers to connecting discrete circuit elements via a same node without an intervening element. An indirect coupling refers to connecting discrete circuit elements via one or more other devices or other discrete circuit elements, including two or more different nodes.

The term "node" (e.g., including a "first node" or an "output node") represents at least a point of electrical connection between two or more components (e.g., circuit elements). Although at times a node may be visually depicted in a drawing as a single point, the node can represent a connection portion of a physical circuit or network that has approximately a same voltage potential at or along the connection portion between two or more components. In other words, a node can represent at least one of multiple points along a conducting medium (e.g., a wire or trace) that exists between electrically connected components. Similarly, a "terminal" or "port" may represent one or more points with at least approximately a same voltage potential relative to an input or output of a component (e.g., a filter circuit or transistor).

The terms "first," "second," "third," and other numeric-related indicators are used herein to identify or distinguish similar or analogous items from one another within a given context—such as a particular implementation, a single drawing figure, a given component, or a claim. Thus, a first item in one context may differ from a first item in another context. For example, an item identified as a "first transistor" in one context may be identified as a "second transistor" in another context. Similarly, a "first terminal" or a "first component" in one claim may be recited as a "second terminal" or a "third component," respectively, in a different claim (e.g., in separate claim sets). An analogous interpretation applies to differential-related terms such as a "plus resistor" and a "minus resistor."

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for a shared filter for transmission and reception have been described in language specific to certain features and/or methods, the subject of the appended claims is not necessarily limited to the specific features or methods described. Rather, the specific features and methods are disclosed as example implementations for a shared filter for transmission and reception.

What is claimed is:
1. An apparatus comprising:
   a wireless interface device comprising:
     a transmit chain comprising a first component and a second component;
     a receive chain comprising a third component and a fourth component; and
     a filter circuit comprising an amplifier, the amplifier comprising a first stage and a second stage, the first stage comprising a transmit portion coupled to the second stage and a receive portion coupled to the second stage, the transmit portion and the second stage coupled together in series between the first component and the second component of the transmit chain, and the receive portion and the second stage coupled together in series between the third component and the fourth component of the receive chain.

2. The apparatus of claim 1, wherein:

the transmit portion of the first stage is coupled between the first component of the transmit chain and the second stage of the amplifier;

the first component comprises an upstream transmit component;

the second component comprises a downstream transmit component;

the receive portion of the first stage is coupled between the third component of the receive chain and the second stage of the amplifier;

the third component comprises an upstream receive component; and the fourth component comprises a downstream receive component.

3. The apparatus of claim 2, wherein:

the upstream transmit component comprises a digital-to-analog converter;

the downstream transmit component comprises a frequency upconverter;

the upstream receive component comprises a frequency downconverter; and the downstream receive component comprises an analog-to-digital converter.

4. The apparatus of claim 2, wherein:

the upstream transmit component comprises at least part of a communication processor;

the downstream transmit component comprises at least one antenna;

the upstream receive component comprises the at least one antenna; and the downstream receive component comprises at least part of the communication processor.

5. The apparatus of claim 1, wherein:

the wireless interface device is configured to share the filter circuit between the transmit chain and the receive chain using time-division multiplexing (TDM).

6. The apparatus of claim 5, wherein:

the wireless interface device is configured to share the filter circuit between the transmit chain and the receive chain by:

propagating a transmit signal through the transmit portion of the first stage of the amplifier and through the second stage of the amplifier during a transmit mode; and propagating a receive signal through the receive portion of the first stage of the amplifier and through the second stage of the amplifier during a receive mode.

7. The apparatus of claim 1, wherein:

the first component comprises a digital-to-analog converter;

the second component comprises a frequency upconverter;

the third component comprises a frequency downconverter; and the fourth component comprises an analog-to-digital converter.

8. The apparatus of claim 7, wherein the wireless interface device further comprises:

an attenuator coupled between the amplifier of the filter circuit and the frequency upconverter; and a programmable gain amplifier coupled between the amplifier of the filter circuit and the analog-to-digital converter.

9. The apparatus of claim 8, wherein:

the attenuator comprises multiple resistors coupled to one or more switches; and the one or more switches of the attenuator are configured to:

establish, in a transmit mode, an attenuation factor of the attenuator; and isolate, in a receive mode, the attenuator from at least one of the filter circuit or the programmable gain amplifier of the receive chain.

10. The apparatus of claim 8, wherein:

the programmable gain amplifier comprises at least one switch; and the at least one switch of the programmable gain amplifier is configured to:

establish, in a receive mode, a gain factor of the programmable gain amplifier; and isolate, in a transmit mode, the programmable gain amplifier from at least one of the filter circuit or the attenuator of the transmit chain.

11. The apparatus of claim 8, wherein:

the wireless interface device further comprises a resistor bank coupled between the programmable gain amplifier and the analog-to-digital converter; and the programmable gain amplifier and the resistor bank comprise part of the receive chain.

12. The apparatus of claim 8, wherein the programmable gain amplifier comprises:

an input stage;

an output stage;

an intermediate stage coupled between the input stage and the output stage; and a first compensation capacitor coupled between the intermediate stage and the output stage.

13. The apparatus of claim 12, wherein:

the output stage comprises a first transistor and a second transistor coupled together in series between a first power distribution node and a second power distribution node; and the programmable gain amplifier comprises a second compensation capacitor coupled between a control terminal of the first transistor and a channel terminal of the first transistor.

14. The apparatus of claim 1, wherein the filter circuit is configured to process signals at a baseband frequency.

15. The apparatus of claim 1, wherein:

the transmit portion of the first stage of the amplifier is configured to process a transmit signal accepted from the first component of the transmit chain; and the receive portion of the first stage of the amplifier is configured to process a receive signal accepted from the third component of the receive chain.

16. The apparatus of claim 15, wherein:

the transmit signal accepted from the first component of the transmit chain is configured to have a first common-mode voltage; and the receive signal accepted from the third component of the receive chain is configured to have a second common-mode voltage that is different from the first common-mode voltage.

17. The apparatus of claim 15, wherein the second stage of the amplifier is configured to:

accept the transmit signal from the transmit portion of the first stage of the amplifier and process the accepted transmit signal; and accept the receive signal from the receive portion of the first stage of the amplifier and process the accepted receive signal.

18. The apparatus of claim 1, wherein the amplifier comprises a transimpedance amplifier.

19. The apparatus of claim 18, wherein:
the receive portion of the first stage of the amplifier comprises a receive-portion transistor;
the second stage of the amplifier comprises a transistor that is configured to propagate a current based on a receive mode;
the transimpedance amplifier comprises a replica transistor relative to the transistor of the second stage, the replica transistor configured to propagate a replica current relative to the current based on the receive mode;
a channel terminal of the replica transistor is coupled to a control terminal of the receive-portion transistor; and
a channel terminal of the receive-portion transistor is coupled to a control terminal of the transistor of the second stage.

20. The apparatus of claim 18, wherein the second stage comprises:
a receive transistor comprising a control terminal and a channel terminal, the control terminal coupled to the receive portion of the first stage of the transimpedance amplifier; and
a transmit transistor comprising a control terminal and a channel terminal, the control terminal of the transmit transistor coupled to the transmit portion of the first stage of the transimpedance amplifier, the channel terminal of the transmit transistor coupled to the channel terminal of the receive transistor.

21. The apparatus of claim 20, wherein:
the receive transistor and the transmit transistor are coupled together in series via the channel terminal of the transmit transistor and the channel terminal of the receive transistor between a first power distribution node and a second power distribution node.

22. The apparatus of claim 1, wherein the filter circuit comprises:
a biquad filter coupled between the amplifier and the second component of the transmit chain and between the amplifier and the fourth component of the receive chain.

23. The apparatus of claim 22, wherein the wireless interface device further comprises:
a switch coupled across at least an input of the biquad filter and an output of the biquad filter.

24. The apparatus of claim 23, wherein:
the filter circuit comprises a passive pole coupled between the amplifier and the second component of the transmit chain and between the amplifier and the fourth component of the receive chain;
the biquad filter and the passive pole are coupled together in series to form a series connection; and
the switch is coupled across the series connection of the biquad filter and the passive pole.

25. The apparatus of claim 23, wherein:
the switch is configured to be in a closed state to bypass the biquad filter based on at least a portion of the receive chain, including the filter circuit, being in a digital predistortion (DPD) mode.

26. An apparatus comprising:
a wireless interface device comprising:
a transmit chain comprising a first component and a second component;
a receive chain comprising a third component and a fourth component; and
a filter circuit comprising an amplifier, the amplifier comprising a first stage and a second stage, the first stage comprising:
means for accepting a transmit signal from the first component of the transmit chain; and
means for accepting a receive signal from the third component of the receive chain,
the means for accepting a transmit signal and the second stage coupled together in series between the first component and the second component of the transmit chain, and
the means for accepting a receive signal and the second stage coupled together in series between the third component and the fourth component of the receive chain.

27. A method of operating a shared filter circuit, the method comprising:
accepting, by a transmit portion of a first stage of an amplifier of a filter circuit, a transmit signal from a first component of a transmit chain of a wireless interface device;
providing, by the transmit portion of the first stage of the amplifier, the transmit signal to a second stage of the amplifier;
forwarding, by the second stage of the amplifier, the transmit signal toward a second component of the transmit chain;
accepting, by a receive portion of the first stage of the amplifier of the filter circuit, a receive signal from a third component of a receive chain of the wireless interface device;
providing, by the receive portion of the first stage of the amplifier, the receive signal to the second stage of the amplifier; and
forwarding, by the second stage of the amplifier, the receive signal toward a fourth component of the receive chain.

28. An apparatus comprising:
a wireless interface device comprising:
a filter circuit including an input and an output, the filter circuit comprising:
a transimpedance amplifier coupled to the input of the filter circuit; and
a biquad filter coupled in series with the transimpedance amplifier between the input and the output of the filter circuit, the biquad filter coupled between the transimpedance amplifier and the output of the filter circuit;
a resistive attenuator coupled to the output of the filter circuit;
a programmable gain amplifier coupled to the output of the filter circuit; and
a resistor bank coupled to the programmable gain amplifier, the programmable gain amplifier coupled between the output of the filter circuit and the resistor bank.

29. The apparatus of claim 28, wherein:
the filter circuit comprises a passive pole coupled between the transimpedance amplifier and the output of the filter circuit; and
the biquad filter and the passive pole are coupled together in series to form a series connection; and the wireless interface device further comprises a switch coupled in parallel with the series connection of the biquad filter and the passive pole.

30. The apparatus of claim 28, wherein:

the wireless interface device further comprises:
- a digital-to-analog converter coupled to the input of the filter circuit;
- a frequency upconverter coupled to the resistive attenuator;
- a frequency downconverter coupled to the input of the filter circuit; and
- an analog-to-digital converter coupled to the resistor bank;

the transimpedance amplifier is coupled between the digital-to-analog converter and the biquad filter;

the transimpedance amplifier is coupled between the frequency downconverter and the biquad filter;

the resistive attenuator is coupled between the biquad filter and the frequency upconverter; and the resistor bank is coupled between the programmable gain amplifier and the analog-to-digital converter.

* * * * *